United States Patent
Okamoto et al.

(10) Patent No.: US 6,934,842 B2
(45) Date of Patent: Aug. 23, 2005

(54) IDENTIFICATION CODE MANAGEMENT METHOD AND MANAGEMENT SYSTEM

(75) Inventors: Chikashi Okamoto, Yokohama (JP); Kazuo Takaragi, Ebina (JP); Yasuko Fukuzawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 772 days.

(21) Appl. No.: 09/801,748

(22) Filed: Mar. 9, 2001

(65) Prior Publication Data

US 2002/0004767 A1 Jan. 10, 2002

(30) Foreign Application Priority Data

Jul. 6, 2000 (JP) ........................................ 2000-210689

(51) Int. Cl.[7] .............................. H04L 9/00; G06F 11/30
(52) U.S. Cl. ....................... 713/168; 713/170; 713/189; 713/190
(58) Field of Search ................................ 713/156, 160, 713/165, 167–170, 176–181, 189–190, 200; 380/277; 705/50–51

(56) References Cited

U.S. PATENT DOCUMENTS

| | | | |
|---|---|---|---|
| 4,659,914 A | | 4/1987 | Kondo et al. |
| 4,965,827 A | * | 10/1990 | McDonald ................... 705/65 |
| 5,159,635 A | | 10/1992 | Wang |
| 5,401,944 A | | 3/1995 | Bravman et al. |
| 5,805,719 A | * | 9/1998 | Pare et al. ................... 382/115 |
| 5,889,941 A | | 3/1999 | Tushie et al. |
| 5,944,794 A | * | 8/1999 | Okamoto et al. ........... 709/225 |
| 5,949,042 A | | 9/1999 | Dietz et al. |

FOREIGN PATENT DOCUMENTS

| | | |
|---|---|---|
| JP | 10289486 | 10/1998 |
| JP | 200090180 | 3/2000 |
| WO | 9904364 | 1/1999 |
| WO | 0031692 | 6/2000 |
| WO | 0031693 | 6/2000 |

OTHER PUBLICATIONS

W. Rankl, "Handbuch Der Chipkarten. Aufbau—Funktionsweise—Einsatz von Smart Cards" 1999, pp. 137–589.
Rankl W. Effing W: "Handbuch Der chipkarten, Aufbau—Funktionsweise, Einsatz Von Smart Cards", 1999, Carl Hanser Verlag, Muenchen, DE pp. 137, 138, 146–150, 169–175, 180–184, 187, 551–554, 578, 582–589.
Rankl W. Effing W.: Handbuch Der Chipkarten, Aufbau Funktionsweise Einsatz Von Smart Cards 1999, Hanser Verlag, Muenchen DE, pp. 127–131.

* cited by examiner

*Primary Examiner*—Hosuk Song
(74) *Attorney, Agent, or Firm*—Mattingly, Stanger, Malur & Brundidge, P.C.

(57) ABSTRACT

An identification code management method and management system includes that the issue and distribution of an ID code having a message authentication code are managed thereby to efficiently and reliably manage a material object using the ID code. An electronic circuit chip with an ID code having a message authentication code stored in a read-only area is used as an identification tag. The information at an ID code order receiving terminal and an identification tag production factory terminal are consolidated and collectively managed at an ID code management terminal. Thereby, the ID code management terminal is inquired of highly confidential information or requested to process the information as required so that an ID code utilization terminal is not required to store the same information.

41 Claims, 16 Drawing Sheets

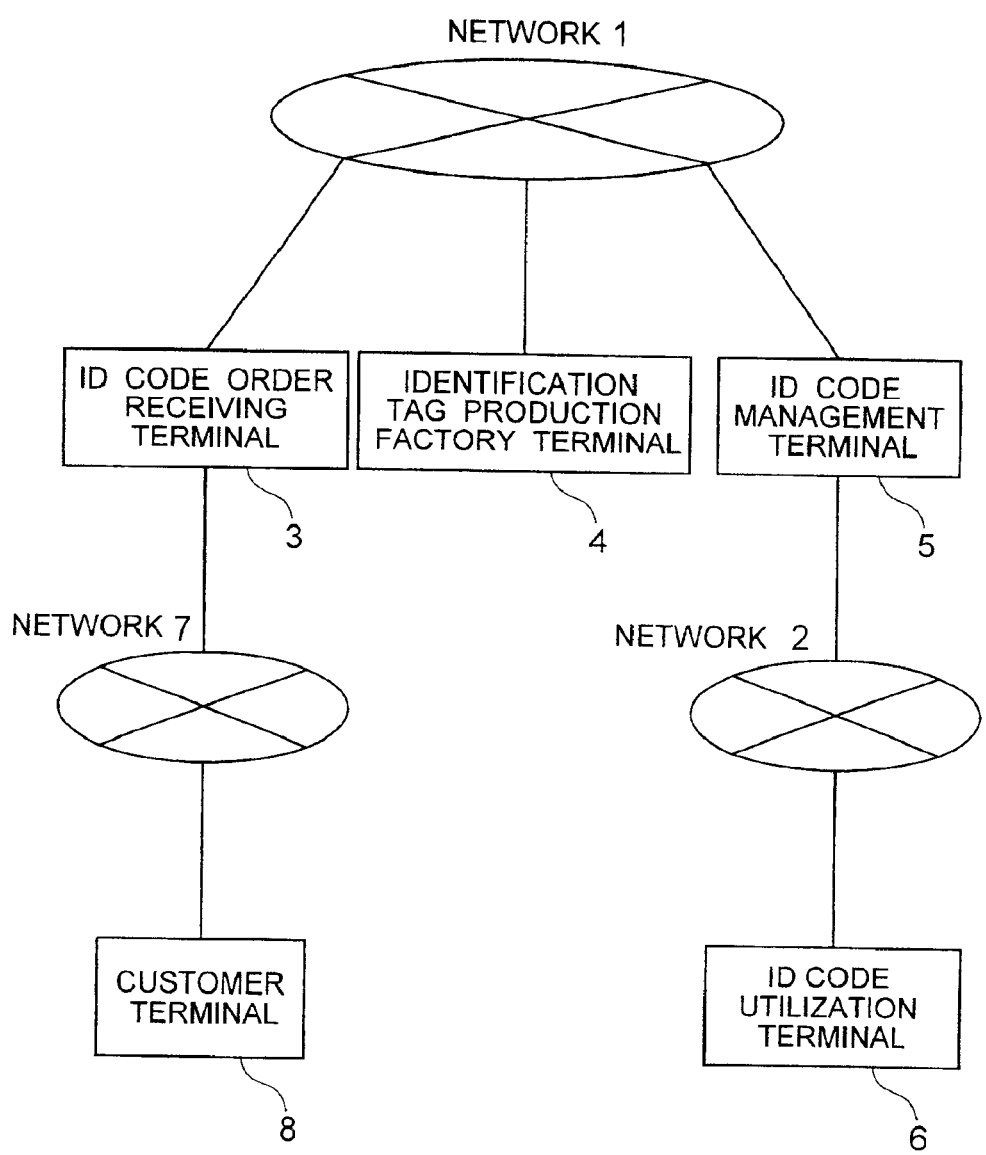

FIG. 17

ID CODE-RELATED INFORMATION MANAGEMENT DATA BASE 53

| | | | | | | | | | | |
|---|---|---|---|---|---|---|---|---|---|---|
| | 532 | 533 | 534 | 535 | 536 | 537 | 100 | 101 | 102 | 538 | 539 |

ORDER RECEIVING INFORMATION 530
- ORDER INFORMATION 531
- EXTENSION ID CODE 200

| CUSTOMER | QTY | CONDITIONS | DELIVERY DATE | VERIFICATION KEY | DECRYPTION KEY | ID | ATTRIBUTE INFORMATION | MESSAGE AUTHENTICATION CODE | ISSUE CONDITION | REMARK |
|---|---|---|---|---|---|---|---|---|---|---|
| COMPANY A | 1 | DROP OUT OK | 98/07/01 | 349267 | 913544 | 12345624 | 6801 | 456123 | ISSUED/ DELIVERED | 98/06/14 DELIVERED TO COMPANY A |
| COMPANY B | — | DROP OUT OK | 98/07/01 | — | — | 23456788 | 0379 | 562347 | REGARDED AS DROP-OUT | 98/05/28 PRODUCTION FAILED |
| COMPANY C | 1 | — | 00/09/20 | 324629 | 886423 | 7252325188 | 2686190 | 527387 | IN PROCESS OF PRODUCTION | 00/8/10 FACTORY C |
| COMPANY D | 1 | — | 98/04/18 | 937246 | — | 724498 | 786439 | 449728 | REGARDED AS INVALID | 00/02/07 SIGNATURE AT TERMINAL E |
| COMPANY F | 1000 | SAME NUMBER | 99/12/03 | 729354 | — | 4972248 | 369784 | 497248 | ISSUED/ DELIVERED | 89/11/29 DELIVERED TO COMPANY F |
| .. | .. | .. | .. | .. | .. | .. | .. | .. | .. | .. |
| COMPANY G | 1 | — | 00/03/25 | 349518 | 297274 | 834278 | 312894 | 834278 | ISSUED/ DELIVERED | 00/03/17 DELIVERED TO COMPANY G |

IDENTIFICATION CODE MANAGEMENT METHOD AND MANAGEMENT SYSTEM

BACKGROUND OF THE INVENTION

The present invention relates to a technique for managing an identification code (hereinafter referred to as "ID code") of material objects, or in particular to a technique for managing the issue and distribution of an ID code having a message authentication code (MAC).

Various ID codes such as the JAN code have been conventionally used for management of material objects by being assigned to them. Material objects can be individually managed by managing the information on the material objects as related to the ID codes assigned to the material objects.

Convenience stores, for example, use a system in which the manufacturers, the names and prices of commodities are managed as related to the JAN code printed on the package of the commodities, and the commodity information can be referred to by reading the bar code and inputting the JAN code.

Also, in order to assure that the value is right, an error detection code is included in the ID code. It is determined whether the read operation has been normally performed by verifying the error detection code of the ID code read, according to a predetermined calculation process.

Further, the error detection code calculated using a numerical value providing a key has the function of detecting the tampering of an ID code by a person having no knowledge of the key. The error detection code calculated using the key will hereinafter be called the message authentication code.

An ID code having the message authentication code is used in the case where a high security is required for an ID code. For example, persons are individually managed by relating them to the material objects carrying an ID code such as an identification card, or marketable securities such as share certificates and gift coupons are managed with an ID code attached thereto.

The conventional ID code management methods described above have the following problems to be solved.

In the case where the JAN code is used as an material object ID code as in the case of convenience stores described above, the ID codes are distributed by type of material objects because of limiting the number of digits on each ID code. The material objects of the same type, therefore, cannot be individually managed one by one.

An ID code having a greater number of digits than the JAN code is available for individual management. In bar code indication, however, such an ID code can not be used for some material objects due to a limited space.

The JAN code has only the error detection code but not the message authentication code using a key, and therefore an ID code is liable to be forged. In the case where the message authentication code is used with the ID code in order to prevent forgery, different keys are required to be used for each several ID codes for security. In the case where various types of ID code are handled as in convenience stores, it is necessary to prepare keys for verification of the message authentication codes for all the ID codes handled.

A person responsible for managing a given material object using an ID code having an message authentication code may acquire a seal or tape carrying the ID code and attach it to the material object. It is difficult, however, for him to manage also the key for verification of the message authentication code.

In the case where an ID code requires a high security, the ID code issue is required to be managed in a way to avoid duplication or the number of the same ID code is required to be managed. For this purpose, it is also necessary to manage the printing of the ID code on the material object or the seal or the writing of the ID code into a memory in an electronic tag.

The credit card ID code is an example in which the ID code issue is managed very safely in a way to avoid the duplication. However, like an ID code used for a credit card, the ID code given to a serving, a man to be subject to a service and a corporation, is simply information but not a substantive object as a material object. Therefore, there is fear that the ID code could be duplicated wickedly after issuing the card.

SUMMARY OF THE INVENTION

The present invention provides a system for managing the issue and distribution of an ID code having a message authentication code that can be assigned to individual material objects and that can efficiently and reliably manage material objects using the ID code.

According to one aspect of the invention, the same type of material objects can be individually assigned different ID codes, using a material object ID code of extension type (hereinafter referred to as the extension ID code) having attribute information and a message authentication code. The attribute information is the one for ID code classification and includes the application field of the ID code, the name of the company that has requested the issue thereof, etc. The message authentication code of the ID code, on the other hand, is generated using a different key for each attribute information.

According to another aspect of the invention, an ID code management terminal for managing the issue and distribution of the ID code is used and connected to an ID code utilization terminal for using the ID code. The ID code management terminal stores various information in the form related to each other, including the ID code issued, the ID code attribute information, the message authentication code and the key for verifying the message authentication code. In response to a request which may be sent from the ID code utilization terminal for verification of an ID code and the message authentication code 102 containing the ID code attribute information and the message authentication code, the ID code management terminal verifies the request using the ID code stored therein and a related message authentication code and returns the result to the ID code utilization terminal. The verification request is the one for verifying the message authentication code 102. Upon receipt of the request for verification key including the ID code attribute information from an ID code utilization terminal, a verification key related to the ID code attribute information is returned to the ID code utilization terminal.

The ID code utilization terminal has the function of reading the ID code, the function of managing the read ID code by relating it to the information on the material object having the ID code and the function of performing an appropriate processing which may be designated by the information on the material object.

According to still another aspect of the invention, a management system comprises an ID code order receiving terminal and an identification tag production factory terminal connected to the ID code management terminal through a network. The ID code order receiving terminal stores the date and the number of the ID codes requested to be issued, the key for generating the message authentication code, etc. and generates the message authentication code using the particular key. The ID code, the ID code attribute information and the message authentication code are combined into single information and transmitted to the ID code management terminal using the cipher communication. After checking to see from the information managed by the ID code management terminal that the ID code is not duplicated with an issued ID code, the combined information is similarly transmitted to the identification tag production factory terminal using the cipher communication.

A plurality of the same ID codes may be issued by including in the attribute information the description to the effect that the ID codes indicate the same information as the bar code.

The identification tag production factory terminal instructs the production unit for producing the identification tags including the electronic tag and the bar code label to print the ID code, the ID code attribute information and the message authentication code on the identification tag or to store them in the identification tag. The ID code inspection unit is instructed to inspect whether the information is rightly stored in the completed identification tag. The information of the produced identification tag and the inspection result are transmitted to the ID code management terminal using the cipher communication.

According to the invention, the ID code can be issued without duplication and individual management of material objects is made possible. Also, a plurality of the same ID codes can be issued and used with the existing bar code system.

According to the invention, the ID code user not holding the verification key or device can obtain the inspection result by transmitting a verification request from the ID code utilization terminal to the ID code management terminal through a network using the information (the ID code, the ID code attribute information and the message authentication code) read from the identification tag.

According to the invention, the ID code user not holding the verification key can obtain the verification key and verify the message authentication code by transmitting a verification key request including the ID code attribute information from the ID code utilization terminal to the ID code management terminal through a network.

According to the invention, the highly confidential information such as the key for generation or verification of the message authentication code and the information on the person requesting the ID code issue can be managed confidentially.

In the present invention, consider the case where an electronic circuit chip is used as an identification tag. The production of an electronic circuit chip requires sufficient equipment. The smaller and thinner the electronic circuit chip, the more limited the persons who can produce the electronic circuit chip. As a result, the likelihood of a third party to produce an identification tag illegally is reduced. A third party cannot tamper the ID code illegally if the ID code is stored in a read-only area of the electronic circuit chip.

According to this invention, the number of the identification tags available on the market can be managed by the ID code management terminal.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram schematically showing an ID code management system used in this embodiment.

FIG. 17 is a diagram for explaining the management information relating to the identification tag 300 stored in an ID code-related information management data base 53 of the ID code management terminal shown in FIG. 6.

DESCRIPTION OF THE EMBODIMENTS

An ID code management system to which an embodiment of the present invention is applicable will be explained.

First, reference is had to the ID code and the identification tag used for the ID code management system according to this embodiment.

FIGS. 1A to 1G are diagrams showing an example of ID codes used with the ID code management system according to this embodiment.

Figure 1A:
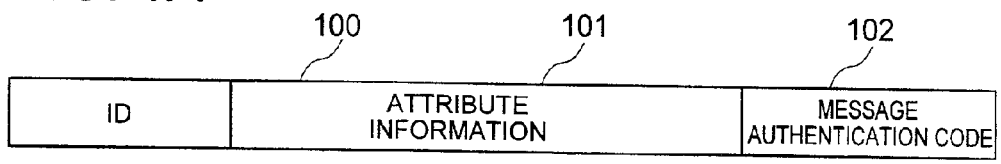
FIGS. 1A to 1G are diagrams showing an example of ID codes used in an ID code management system according to an embodiment.

As shown in FIG. 1A, an ID code 100 used according to this embodiment includes ID code attribute information 101 and an message authentication code 102 which are used collectively as an extension ID code 200 (FIG. 17). The attribute information 101 is defined as information for classifying the ID code 100 and represents the field of application of the ID code 100 and the name of the company that has requested the issue thereof. The message authentication code 102 is generated by conducting a predetermined calculation on the ID code 100 and the attribute information 101 using different keys for different attribute information 101. The calculation for generating the message authentication code 102 preferably uses a combination of a public key password, a common key password and the hash generating function.

Figure 1B:
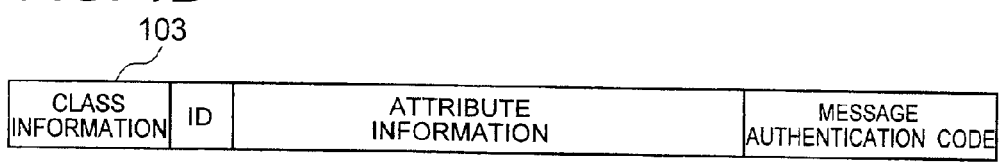

FIG. 1B shows the case in which the three elements of FIG. 1A are accompanied by class information 103. The class information is defined as information indicating the dividing position of the ID code 100 and the attribute information, i.e. the number of the digits of the ID code 100 and the attribute information 101, respectively.

Figure 1C:
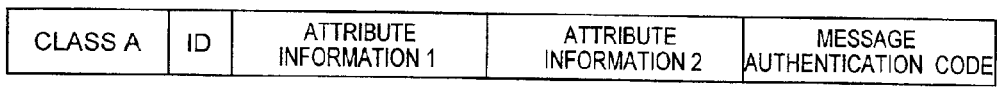
Figure 1D:
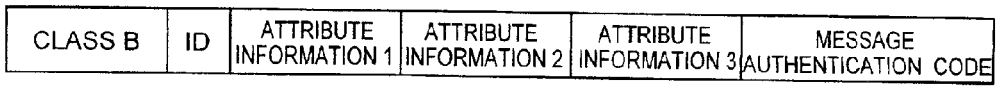
Figure 1E:
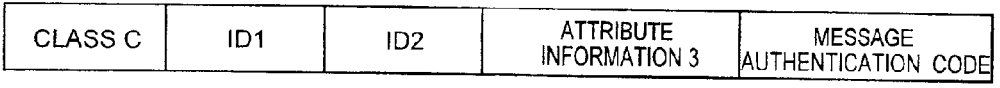

As shown in FIGS. 1C, 1D, 1E, the use of the class information 103 can construct an extension ID code 200 with the variously changed number of digits and the number of the ID code 100 and the attribute information 101 while the same number of digits of the extension ID code 200 and the message authentication code 102 remains the same.

As a result, the extension ID code 200 having the optimal number of digits of the ID code 100 and the attribute information 101 and the best combination thereof according to the application involved can be employed without changing the system used for delivery of the extension ID code 200 or generation or verification of the message authentication code 102.

Figure 1F:
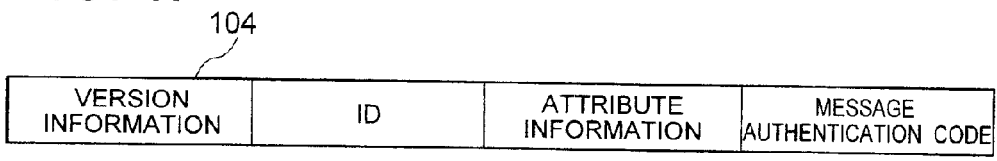

FIG. 1F shows the case in which the three elements of FIG. 1A are accompanied by version information 104. The version information is the one indicating a version of the extension ID code 200. The number of digits of the extension ID code 200, the number of digits of the message authentication code 102 and the calculation method can be determined from the version information 104.

Figure 1G:
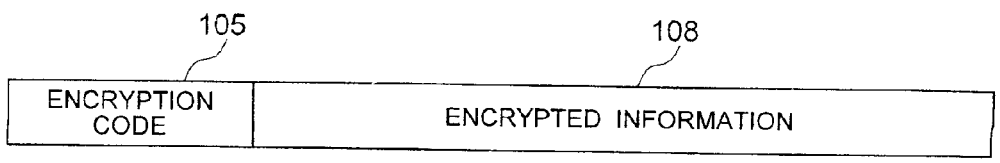

FIG. 1G shows the case in which the extension ID code 200 is encrypted. The extension ID code 200 includes an encryption code 105 indicating the fact of encryption and encrypted information 106 of the three elements of FIG. 1A. The use of the extension ID code 200 in encrypted form makes it impossible for any person not informed of the encryption key to identify the component elements of the extension ID code 200 and therefore illegal decoding can be prevented. The extension ID code 200 is not limited to those described above, but a combination of arbitrary two or all can be used among the addition of the class information 103 and the addition and encryption of the version information 104.

Figure 2A:
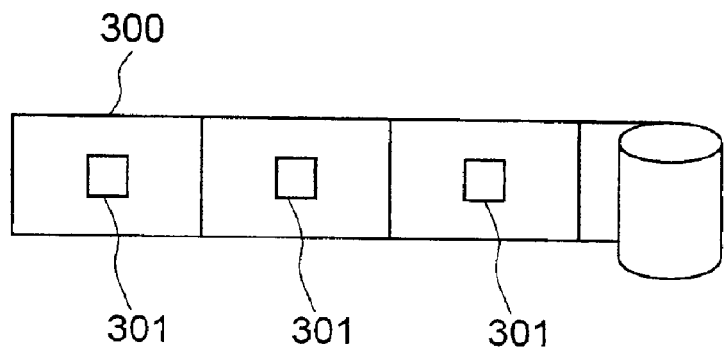
FIGS. 2A to 2C are diagrams showing an example of an identification tag used in an ID code management system according to an embodiment.
Figure 2B:
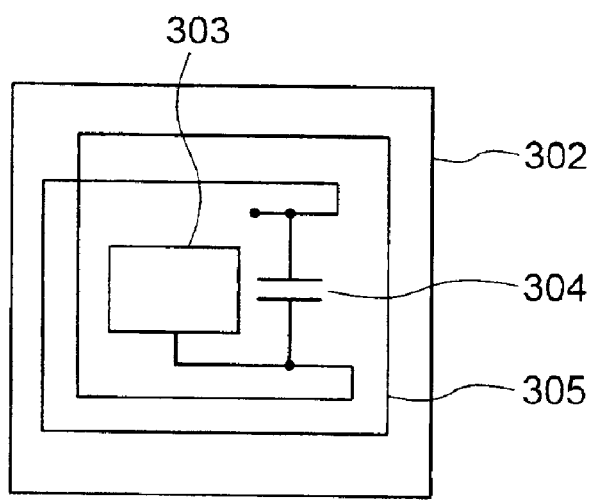
Figure 2C:
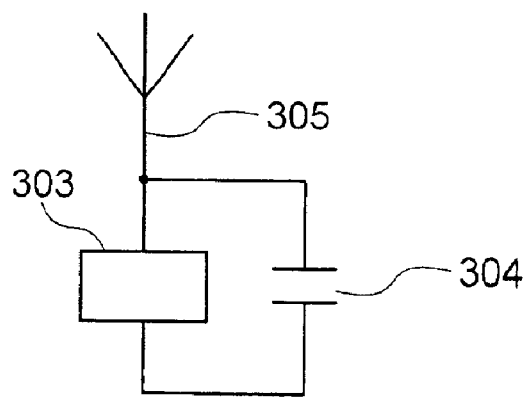

FIGS. 2A to 2C are diagrams showing an example of an identification tag used for the ID code management system according to this embodiment. FIG. 2A shows an identification tag 300 in tape form with a plurality of electronic circuit chips 301 mounted thereon. A tape carrying an arbitrary number of electronic circuit chips can be obtained by cutting off the tape at an appropriate position.

The identification tag 300, which is shown above as a tape carrying the electronic circuit chips 301, may alternatively be in the shape of sheet, or constituted of the electronic circuit chips 301 themselves or a label printed with an ID code.

The electronic circuit chip 301 is, for example, a small-sized electronic circuit chip about 0.3 mm square in size which can be manufactured only by a semiconductor manufacturer having sufficient equipment, and substantially has the shape of a thin parallelepiped.

As shown in FIG. 2B, an electronic circuit 303 functioning as a memory and a read circuit for the memory, a capacitor 304 and an antenna 305 are formed on a silicon chip 302. The memory is assumed to include a read-only memory portion. The read-only memory portion stores the extension ID code 200.

The extension ID code 200 is stored in the read-only memory portion of the electronic circuit 303 by the manufacturer of the electronic circuit chip 301 before the chip 301 is shipped to the manufacturer of the identification tag 300.

The read-only memory portion of the electronic circuit 303 is assumed to include also a rewritable memory such as an EEPROM of which the portion containing the written extension ID code 200 is set as a read-only portion, for example, in addition to a read-only memory such as a ROM.

The electronic circuit 303, the capacitor 304 and the antenna 305 make up a circuit as shown in FIG. 2C. This circuit induces a current in an antenna 305 by a radio wave applied from an external source and stores the charge in the capacitor 304. The information stored in the electronic circuit 303 is transmitted by the radio wave from the antenna 305 using the power obtained from the charge accumulated in the capacitor 304. Specifically, by applying a radio wave to the electronic circuit chip 301, the extension ID code 200 stored in the electronic circuit 303 of the electronic circuit chip 301 can be read without contact by an external means.

Now, an explanation will be given of a configuration of an ID code management system for managing the extension ID code 200 using the identification tag 300 described above.

FIG. 3 is a schematic diagram showing an ID code management system according to this embodiment.

As shown in FIG. 3, the ID code management system according to this embodiment comprises an ID code order receiving terminal 3, an identification tag production factory terminal 4 and an ID code management terminal 5 connected to a network 1 such as a dedicated network or an internet.

Although the example shown in FIG. 3 shows one each of the terminal 3 and the terminal 4, a plurality of terminals 3 or 4 may alternatively be used with equal effect. The customer terminal 8 is connected to the ID code order receiving terminal 3 through a network 7 such as a dedicated network or an internet. The ID code management terminal 5 is connected to the ID code utilization terminal 6 through a network 2 such a dedicated network or an internet. The network 1, the network 2 and the network 7 may be identical to each other.

The customer terminal 8 is a terminal to which the customer inputs the order information required for ordering the identification tag 300, and transmits the order information to the ID code order receiving terminal 3.

The ID code order receiving terminal 3 is for receiving an order for issue of the extension ID code 200, and generates the extension ID code 200 including the ID code 100, the attribute information 101 and the message authentication code 102 from the order information sent from the customer terminal 8, and transmits the extension ID code 200 to the identification tag production factory terminal 4.

The identification tag production factory terminal 4, on the other hand, is for managing the production of the identification tag 300, and transmits to the ID code management terminal 5 the production condition of the identification tag 300 having the extension ID code 200 sent from the ID code order receiving terminal 3. The ID code management terminal 5 manages the information sent from the ID code order receiving terminal 3 and the identification tag production factory terminal 4 and responds to the request sent from the ID code utilization terminal 6.

The ID code utilization terminal 6 is for reading the extension ID code 200 from the identification tag 300 and utilizing the information managed as an item related to the extension ID code 200, and transmits a request to the ID code management terminal 5 whenever required.

The ID code order receiving terminal 3 may be eliminated by giving the ID code management terminal 5 the function of the ID code order receiving terminal 3. Also, the identification tag production factory terminal 4 may be eliminated by giving the ID code management terminal 5 the function of the identification tag production factory terminal 4. Similarly, the ID code utilization terminal 6 may be eliminated by giving the ID code management terminal 5 the function of the ID code utilization terminal 6. Further, the customer terminal 8 may be eliminated by giving the ID code order receiving terminal 3 the function of the customer terminal 8.

A plurality of the customer terminals 8 and a plurality of the ID code utilization terminals 6 may be used.

It is desirable to use the cipher communication between the customer terminal 8 and the ID code order receiving terminal 3, between the ID code order receiving terminal 3 and the identification tag production factory terminal 4, between the ID code order receiving terminal 3 and the ID code management terminal 5, between the identification tag production factory terminal 4 and the ID code management terminal 5 and between the ID code management terminal 5 and the ID code utilization terminal 6. The method of cipher communication, however, may be varied from one case to another as long as communication is possible between a given pair of terminals. Instead of cipher communication, communication may be conducted after authentication.

Now, each device making up the ID code management system described above will be explained below.

Figure 16:
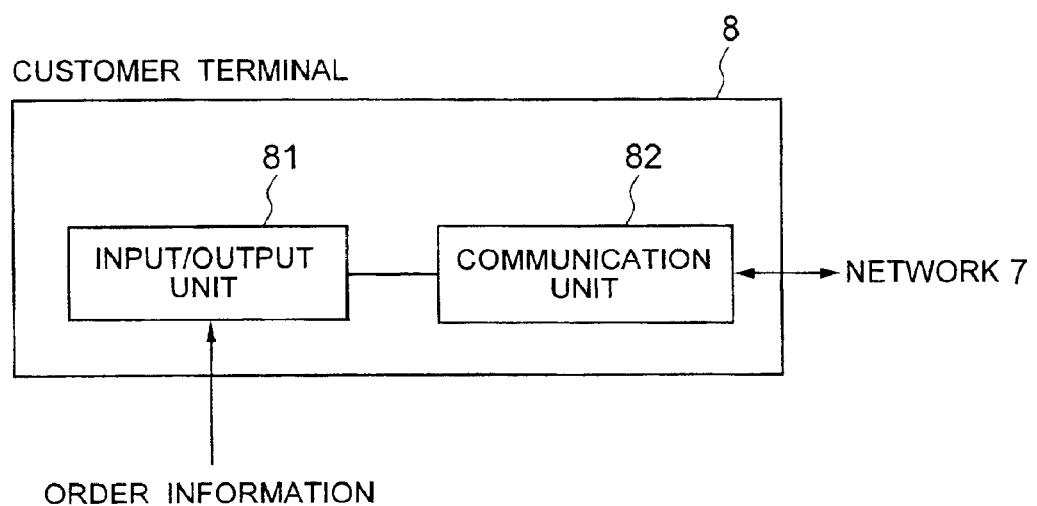
FIG. 16 is a schematic diagram showing a functional configuration of the customer terminal 8 shown in FIG. 3.

FIG. 16 is a schematic diagram showing a functional configuration of the customer terminal 8.

As shown in FIG. 16, the customer terminal 8 includes an input/output unit 81 and a communication unit 82. The input/output unit 81 receives the order information required for ordering the identification tag 300. The order information is defined as the information required for generation and management of the extension ID code 200 including the ID code 100 to be stored in the identification tag 300 and the key for decrypting the encrypted extension ID code 200, and the information required for ordering the identification tag 300 including the orderer information, the ordering date and time, delivery time and the designated delivery method.

The order receiving information is output from the ID code order receiving terminal 3. The order receiving information is defined as the information required for managing the extension ID code 200 including the order information, the extension ID code 200 stored in the identification tag 300, the key used for generating the message authentication code by the ID code order receiving terminal 3, the key for verification and the key automatically generated for encryption and decryption, and the information required for delivery of the identification tag 300 including the order receiving date and time, the delivery date and time, and the delivery method.

The communication unit 82 encrypts for communication the order receiving information request including the order information received from the input/output unit 81 and transmits it to the ID code order receiving terminal 3 through the network 7. Also, the encrypted order receiving information is received from the ID code order receiving terminal 3 and decrypted. The encryption for communication uses a common key password or a public key password or a combination of the common key password and the public key password.

Figure 4:
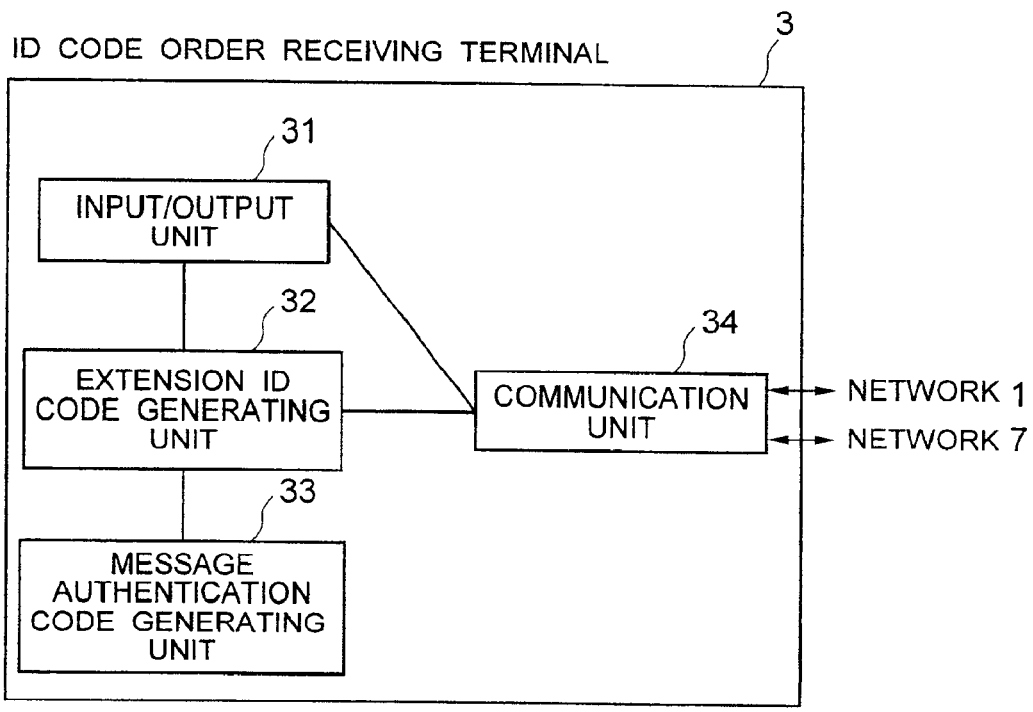
FIG. 4 is a diagram schematically showing a functional configuration of an ID code order receiving terminal 3 shown in FIG. 3.

FIG. 4 is a schematic diagram showing a functional configuration of the ID code order receiving terminal 3. As shown in FIG. 4, the ID code order receiving terminal 3 includes an input/output unit 31, an extension ID code generating unit 32, a message authentication code generating unit 33 and a communication unit 34.

The communication unit 34 decrypts the encrypted message received from the customer terminal 8 through the network 7 and acquires the order receiving information request including the order information. The same encryption method as used for the communication unit 82 of the customer terminal 8 is used.

The input/output unit 31 outputs error information, etc. The input/output unit 31 is used for directly receiving the order information but not from the customer terminal 8 through the network 7.

The extension ID code generating unit 32 generates the ID code attribute information 101 from the order information received from the communication unit 34.

The ID code 100, the attribute information 101 and the key for generating the message authentication code are delivered to the message authentication code generating unit 33, and the message authentication code 102 generated and the verification key are received.

In the case where the order information includes no key for generating the message authentication code, a random number is generated and the value thus generated is used as a key for generating the message authentication code. Further, the extension ID code 200 is generated from the ID code 100, the attribute information 101 and the message authentication code 102.

The attribute information 101 may be either the class information 103 or the version information 104.

In the case where the key for encrypting the extension ID code 200 is not included in the order information, a random number is generated and the value thus generated is used as an encryption key.

Also, the extension ID code generating unit 32 has the function of encrypting the extension ID code 200 and generating the encryption code 105 and the decryption key.

The extension ID code and the key generated are added to the order information thereby to constitute the order receiving information.

The message authentication code generating unit 33 generates the message authentication code 102 and the verification key from the ID code 100 from the ID code 100, the attribute information 101 and the key for generating the message authentication code that have been received from the extension ID code generating unit 32, and delivers them to the extension ID code generating unit 32.

The communication unit 34 encrypts for communication the ID code duplication check request including the order information received from the customer terminal 8 through the network 7, and transmits it to the ID code management terminal 5 through the network 1. In place of the order information, the extension ID code 200 received from the input/output unit 31 may be transmitted. After receiving the notification from the ID code management terminal 5 that there is no duplication with the issued ID code, the order receiving ID code registration request including the order receiving information received from the input/output unit 31 is encrypted for communication, and transmitted to the ID code management terminal 5 through the network 1. In the case where the ID code duplication is permitted, however, the ID code duplication check request may not be transmitted.

The identification tag production request including the order receiving information received from the input/output unit 31 is encrypted for communication, and transmitted to the identification tag production factory terminal 4 through the network 1. A common key password or a public key password or a combination of the common key password and the public key password is used for encryption for communication.

Also, the order receiving information received from the input/output unit 31 is encrypted for communication, and transmitted to the customer terminal 8 through the network 7. The same encryption method is used as in the communication unit 82 of the customer terminal 8.

Figure 5:
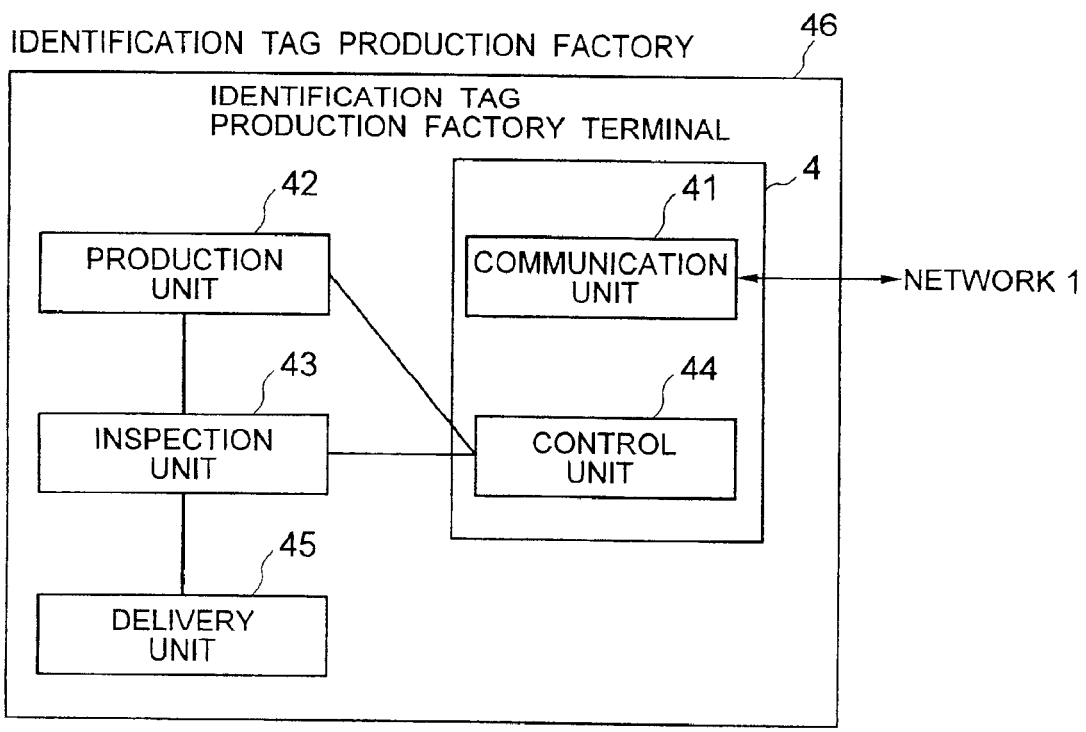
FIG. 5 is a diagram schematically showing a functional configuration of an identification tag production factory 46 shown in FIG. 3.

FIG. 5 is a schematic diagram showing a functional configuration of the identification tag production factory 46.

As shown in FIG. 5, the identification tag production factory 46 includes an identification tag production factory terminal 4, a production unit 42, an inspection unit 43 and a delivery unit 45. The identification tag production factory terminal 4 includes a communication unit 41 and a control unit 44.

The communication unit 41 decrypts the encrypted message received from the ID code order receiving terminal 3 through the network 1, and thereby obtains an identification tag production request including the order receiving information. The same encryption method is used as in the communication unit 34 of the ID code order receiving terminal 3.

The control unit 44 receives the order receiving information obtained in the communication unit 41, and instructs the production unit 42 to produce, in accordance with the order receiving information, the identification tag 300 storing the extension ID code 200 included in the order receiving information. Also, the control unit 44 sends the extension ID code 200 to the inspection unit 43 and instructs the inspection unit 43 to check whether the function of the completed identification tag 300 is normal or not.

In the case where the inspection result is a failure, the extension ID code 200 is delivered to the production unit 42 and the production unit 42 is instructed to produce the identification tag 300 again.

The extension ID code 200 for which the inspection result has been a failure may alternatively be delivered to the communication unit 41 as a drop-out ID. On the other hand, the extension ID code 200 attached to the identification tag 300 for which the inspection result is successful is delivered to the communication unit 41 as a produced ID.

The communication unit 41 generates a drop-out ID code registration request including a drop-out ID code and a produced ID code registration request including a produced ID, encrypts them for communication and transmits them to the ID code management terminal 5 through the network 1. A common key password or a public key password or a combination of the common key password and the public key password is used for encryption for communication.

The production unit 42 produces the identification tag 300 storing the extension ID code 200 received from the control unit 44. The identification tag 300 thus produced is delivered to the inspection unit 43.

The inspection unit 43 inspects the identification tag 300 received from the production unit 42, and checks that the extension ID code 200 received from the control unit 44 has been rightly stored. The inspection result is sent to the control unit 44.

The delivery unit 45 receives the identification tag 300 that has passed the inspection in the inspection unit 43. In accordance with the delivery method included in the order receiving information, the identification tag 300 is sent and delivered to the customer.

Figure 6:
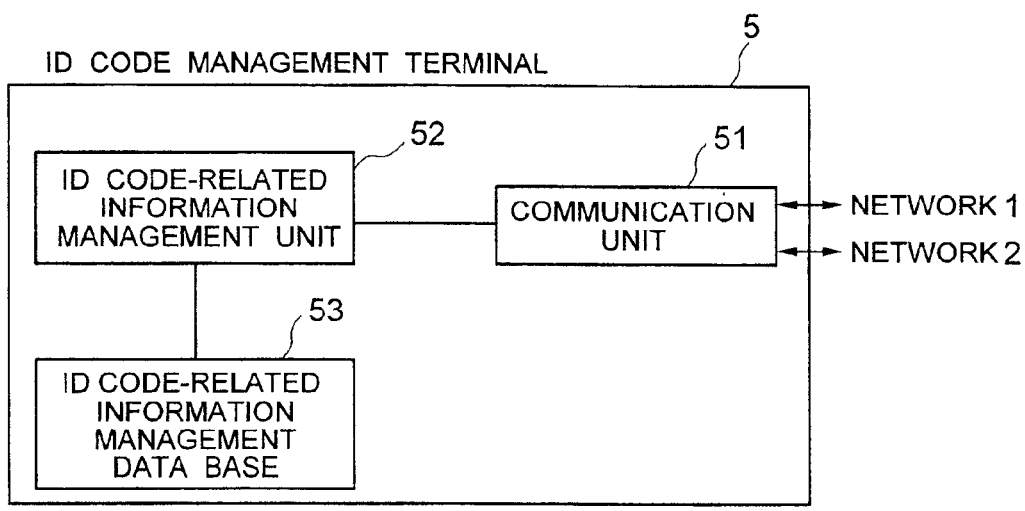
FIG. 6 is a diagram schematically showing a functional configuration of an ID code management terminal 5 shown in FIG. 3.

FIG. 6 is a schematic diagram showing a functional configuration of the ID code management terminal 5.

As shown in FIG. 6, the ID code management terminal 5 includes a communication unit 51, an ID code-related information management unit 52 and an ID code-related information management data base 53.

The communication unit 51 decrypts the encrypted message received from the ID code order receiving terminal 3 through the network 1, and acquires an ID code duplication check request including the order receiving information or an order receiving ID code registration request including the order receiving information. The same encryption method is used as in the communication unit 34 of the ID code order receiving terminal 3. Also, the encrypted message received from the identification tag production factory terminal 4 through the network 1 is decrypted thereby to acquire a drop-out ID code registration request including a drop-out ID code and a produced ID code registration request including a produced ID code.

The same encryption method as in the communication unit 41 of the identification tag production factory terminal 4 is used. Also, the encrypted message received from the ID code utilization terminal 6 through the network 2 is decrypted thereby to acquire a verification request including the extension ID code 200, a verification key request including the attribute information 101 or a decryption key request. The same encryption method is used as in the communication unit 61 of the ID code utilization terminal 6.

In the case where the request received from the communication unit 51 is an ID code duplication check request, the ID code-related information control unit 52 checks whether the issued ID code is duplicated based on the extension ID code 200 included in the order receiving information received together with the particular request and the extension ID code 200 stored in the ID code-related information management data base 53. The result of the check is encrypted by the communication unit 51 and transmitted through the network 1 to the ID code order receiving terminal 3.

In the case where the request received from the communication unit 51 is an order receiving registration request, on the other hand, the order receiving request received together with it is stored in the ID code-related information management data base 53.

In the case where the request received from the communication unit 51 is a drop-out ID code registration request, the drop-out ID code received together with it is stored in the ID code-related information management data base 53.

In the case where the request received from the communication unit 51 is a produced ID code registration request, the produced ID code received together with it is stored in the ID code-related information management data base 53.

In the case where the request received from the communication unit 51 is a verification request, the extension ID code 200 received together with it is verified by being compared with the extension ID code 200 stored in the ID code-related information management data base 53.

The result of verification is encrypted by the communication unit 51 and transmitted to the ID code utilization terminal 6 through the network 2.

In the case where the request received from the communication unit 51 is a verification key request, the key for verification of the message authentication code 102 stored in the ID code-related information management data base 53 is taken out from the attribute information 101 received together with it, encrypted by the communication unit 51 and transmitted to the ID code utilization terminal 6 through the network 2.

In the case where the request received from the communication unit 51 is a decryption key request, the key for decryption is taken out of the ID code-related information management data base 53, decrypted by the communication unit 51 and transmitted to the ID code utilization terminal 6 through the network 2.

A common key password or a public key password or a combination of the common key password and the public key password is used for encryption for communication.

In the case where the request received from the communication unit 51 is an invalid ID code registration request, the invalid ID code 200 received together with it is stored in the ID code-related information management data base 53.

The management information relating to the identification tag 300 is stored in the ID code-related information management data base 53. FIG. 17 is a diagram for explaining the management information relating to the identification tag 300 stored in the ID code-related information management data base 53.

As shown in FIG. 17, the management information relating to the identification tag 300 is configured with the order receiving information 530 sent from the ID code order receiving terminal 3, an ID code issue condition 538 such as "issued/delivered", "dropped-out", "in-process" or "invalid" and a remark 539 making up other management information.

The order receiving information 530 includes the order receiving information 531 received at the customer terminal 8, and the extension ID code 200 generated from the order information 531 at the ID code order receiving terminal 3. The order receiving information 531, on the other hand, includes customer information 532, the number 533 of ID codes ordered for by the customer, issue conditions 534 such as a drop-out or duplication, a designated delivery date 535 of the ID code 300, a key 536 for verification of the message authentication code 102 corresponding to the ID code attribute information 101, a decryption key 537 for the extension ID code 200 encrypted and attached to the identification tag 300, and an ID code 100 of which the issue is desired by the customer.

Figure 7:
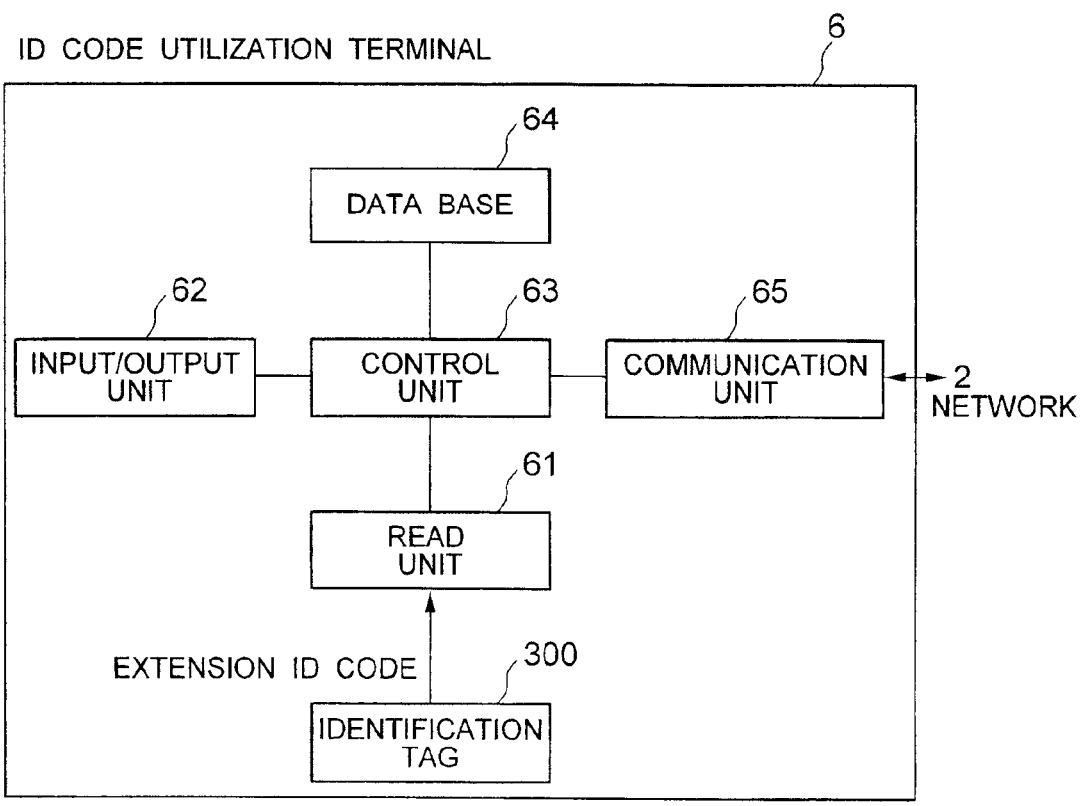
FIG. 7 is a diagram schematically showing a functional configuration of an ID code utilization terminal 6 shown in FIG. 3.

FIG. 7 is a schematic diagram showing a functional configuration of the ID code utilization terminal 6. As shown in FIG. 7, the ID code utilization terminal 6 includes an ID code read unit 61, an input/output unit 62, a control unit 63, a data base 64 and a communication unit 65.

The ID code read unit 61 reads the extension ID code 200 attached to the identification tag 300. In the case where the extension ID code is stored in the memory of the electronic circuit chip 301, for example, a radio wave is transmitted to drive the electronic circuit chip 301 mounted on the identification tag 300. Thus, the data transmitted from the particular electronic circuit chip 301 is read.

In the case where the received data contains the encryption code 105, the received data is decrypted thereby to obtain the extension ID code 200.

The key used for decryption may be stored in the data base 64 in advance, or may be acquired from the ID code management terminal 5 by transmitting a decryption key request to the ID code management terminal 5 through the communication unit 65. Also, the verification result may be acquired from the ID code management terminal 5 by transmitting a verification request including the read extension ID code 200 to the ID code management terminal 5 through the communication unit 65.

The input/output unit 62 inputs information to be newly registered or information to be updated to the data base 64 and displays the information read out. It also receives an instruction for reading the ID, reading/writing the data base or communication and outputs the result.

The control unit 63 controls the ID code read unit 61, the input/output unit 62, the data base 64 and the communication unit 65. Also, the control unit 63 verifies the message authentication code 102 of the extension ID code 200 that has been read. The key for verification may be stored in the data base 64 in advance or may be acquired from the ID code management terminal 5 by transmitting a verification key request including the attribute information 101 to the ID code management terminal 5.

The result of verification of the message authentication code 102 may be acquired from the ID code management terminal 5 by transmitting a verification request including the extension ID code 200 to the ID code management terminal 5. Once the verification of the message authentication code 102 proves successful, the corresponding information in store is retrieved from the data base 64 and output through the input/output unit 62.

In the case where the information thus retrieved indicates a process, the particular process is carried out. The process includes, for example, payment, transfer to another terminal or an inquiry about the URL (uniform resource locator) indicated by the information.

In the case where the ID code fails to be read, on the other hand, the ID code read unit 61 is caused to perform the read operation again or the particular ID code is designated as an invalid ID, and by attaching a digital signature thereto, the communication unit 65 is caused to transmit an invalid ID code registration request to the ID code management terminal 5.

The data base 64 stores the extension ID code 200 and the information on the material objects managed as items corresponding to the identification tag 300 carrying the extension ID code 200. The ID code attribute information 101 and the key for verification of the corresponding message authentication code 102 are also stored by relating them to each other. Further, the key for decrypting the encrypted extension ID code 200 attached to the identification tag 300 is stored.

The communication unit 65 generates a decryption key request, a verification key request including the attribute information 101, a verification request including the extension ID code 200 and an invalid ID code registration request including an invalid ID, encrypts them for communication, and transmits them to the ID code management terminal 5 through the network 2. A common key password or a public key password or a combination of the common key password and the public key password is used for encryption for communication.

The ID code read unit 61 and the input/output unit 62 of other terminals than the ID code utilization terminal 6 may be used and connected through a network to the ID code utilization terminal 6. Also, a plurality of ID code read units 61 and input/output units 62 may be used.

Figure 8:
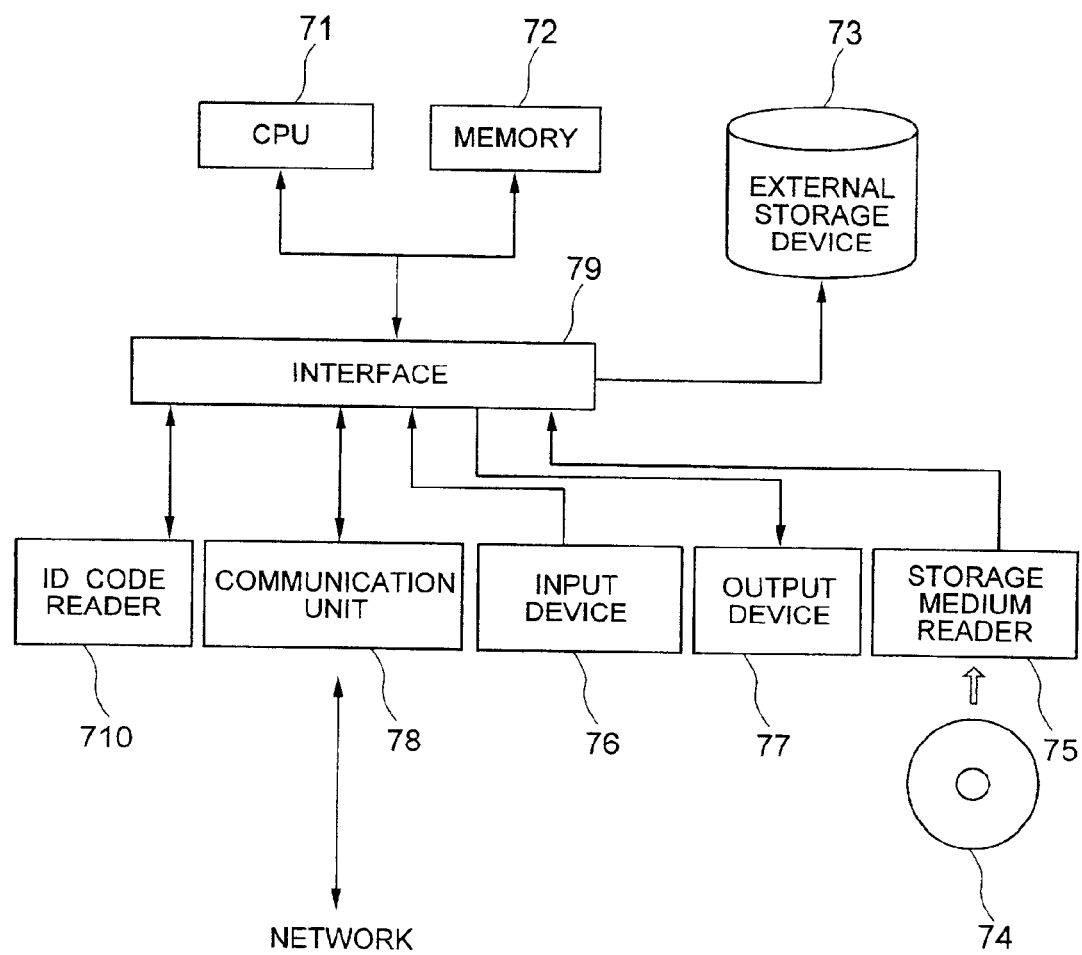
FIG. 8 is a diagram showing an example of a hardware configuration of the devices 3 to 6 and 8 making up the ID code management system shown in FIG. 3.

The customer terminal 8, the ID code order receiving terminal 3, the identification tag production factory terminal 4 and the ID code management terminal 5, as shown in FIG. 8, can be constructed on a computer having an ordinary configuration comprising a CPU 71, a memory 72, an external storage device 73 such as a hard disk unit, a storage medium reader 75 for reading data from a storage medium 74 such as a FD, a CD-ROM or a DVD-ROM, input devices 76 such as a keyboard and a mouse, an output device 77 such as a monitor, a communication unit 78 for establishing communication with other devices through a network and an interface 79 engaged in transmission and receipt of data between the aforementioned devices.

The input/output unit 31 of the ID code order receiving terminal 3, the extension ID code generating unit 32, the message authentication code generating unit 33, the communication unit 34, the communication unit 51 of the ID code management terminal 5, the ID code-related information management unit 52 and the ID code-related information management data base 53 described above can be implemented specifically as a process on a computer by the CPU 71 executing the program loaded in the memory 72. The memory 72 and the external storage device 73 are used as the ID code-related information management data base 53 for the ID code management terminal 5.

The program executed by the CPU 71 for implementing the ID code order receiving terminal 3 on the computer is stored in the external storage device 73 in advance and, whenever required, loaded in the memory 72 and executed by the CPU 71. As an alternative, the same program is loaded in the memory 72 from the storage medium 74 through the storage medium reader 75 and executed by the CPU 71.

As another alternative, after being installed in the external storage device 73 from the storage medium 74 through the storage medium reader 75, the program is loaded in the memory 72 from the external storage device 73, as required, and executed by the CPU 71.

As still another alternative, the program, after being once downloaded to the external storage device 72 through the transmission medium and the communication unit 78 on the network from other computers and then loaded in the memory 72, or loaded in the memory 72 directly from the network and executed by the CPU 71.

The ID code utilization terminal 6 described above can be constructed on a system including the computer shown in FIG. 8, and an ID code reader 710 such as an electronic circuit chip reader, a bar code reader, an OCR or an electronic scanner.

The ID code reader 61, the input/output unit 62, the control unit 63, the data base 64 and the communication unit 65 of the ID code utilization terminal 6 are implemented as a process specifically on the system by the CPU 71 executing the program loaded in the memory 72.

In this case, the memory 72 and the external storage device 73 are used as the data base 64. The program executed by the CPU 71 for implementing the identification tag production factory terminal 4 on the system is stored in the external storage device 73 in advance, and whenever required, loaded in the memory 72 and executed by the CPU 71.

As an alternative, the program is loaded in the memory 72 from the storage medium 74 through the storage medium reader 75 and executed by the CPU 71.

As another alternative, the program, after being installed in the external storage device 73 from the storage medium 74 through the storage medium reader 75, is loaded in the memory 72 from the external storage device 73 as required, and executed by the CPU 71.

As still another alternative, the program, after being temporarily downloaded into the external storage device 73 through the transmission medium and the communication unit 78 on the network from other computers, is loaded in the memory 72, or directly loaded in the memory 72 from the network and executed by the CPU 71.

Now, the operation of the ID code management system described above will be explained.

First, reference is had to the operation of the customer terminal 8.

Figure 18:
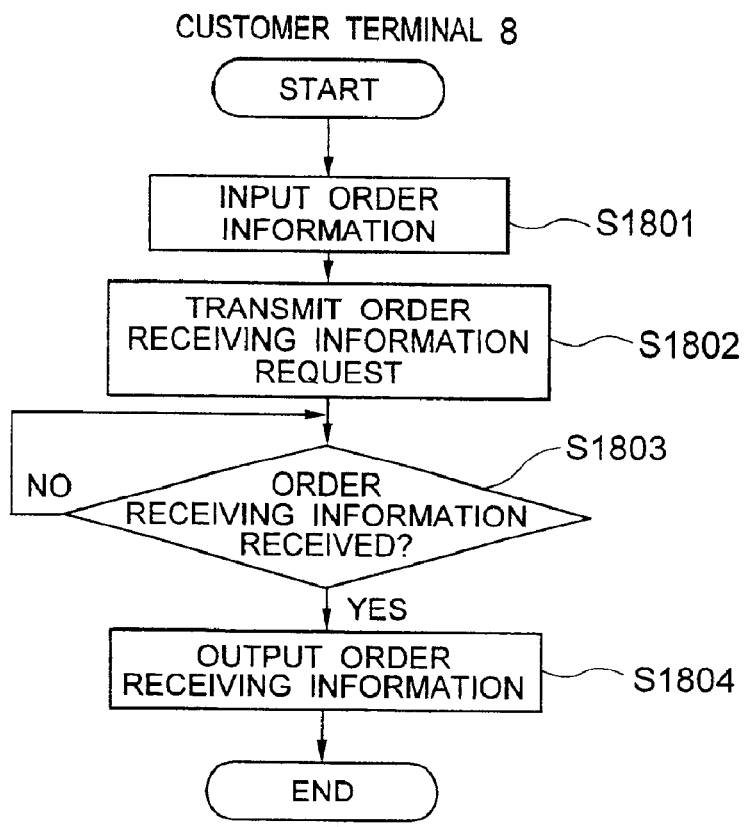
FIG. 18 is a flowchart for explaining the operation of the customer terminal 8 shown in FIG. 16.

FIG. 18 is a flowchart for explaining the operation of the customer terminal 8 briefly.

The order receiving information of the identification tag 300 is received by the input/output unit 81 (step 1801) (hereinafter referred to as S1801, as the other steps are similarly referred to).

The communication unit 82 generates an order receiving information request including the order receiving information received in S1801, and after being encrypted for communication, transmitted to the ID code order receiving terminal 3 through the network 7 (S1802). The communication unit 82 then stands by until it received the order receiving information from the ID code order receiving terminal 3 (S1803). Upon receipt of the order receiving information (YES in S1803), the communication unit 82 decrypts the encrypted message received, and the input/output unit 81 outputs the order receiving information obtained at the communication unit 82 (S1804).

Now, the operation of the ID code order receiving terminal 3 will be explained.

Figure 9:
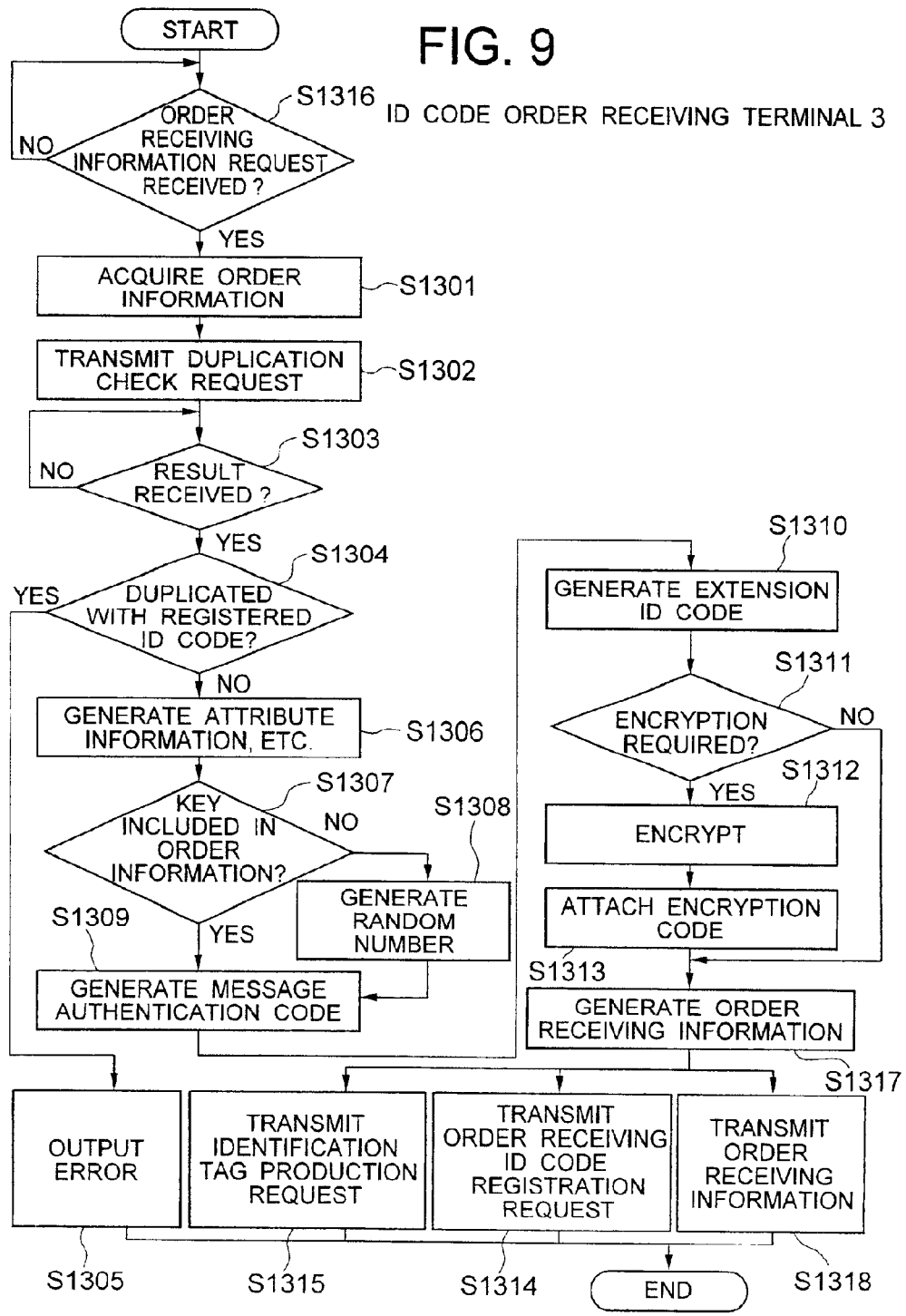
FIG. 9 is a flowchart for explaining the operation of the ID code order receiving terminal 3 shown in FIG. 4.

FIG. 9 is a flowchart for explaining the operation of the ID code order receiving terminal 3 briefly.

First, the communication unit 41 stands by until receipt of the order receiving information request including the order information from the customer terminal 8 through the network 7 (S1316). Upon receipt of the order receiving information request (YES in S1316), the communication unit 41 decrypts the encrypted message received and thus acquires the order information (S1301).

Then, the communication unit 34 generates an ID code duplication check request including the order information received in S1301, and after encryption for communication, transmits it to the ID code management terminal 5 through the network 1 (S1302). The communication unit 34 then stands by until the receipt of the result of processing the ID code duplication check request from the ID code management terminal 5 (S1303).

In the case where the ID code indicated by the order information is duplicated with the ID code registered in the ID code management terminal 5 (YES in S1304), the input/output unit 31 outputs an error (S1305). In the absence of duplication (NO in S1304), on the other hand, the extension ID code generating unit 32 generates the ID code attribute information 101, the class information 103 and the version information 104 from the order information (S1306). In the case where the order information does not include the key for generating the message authentication code 102 or the key for encrypting the extension ID code 200 (NO in S1307), the extension ID code generating unit 32 generates a random number (S1308).

Then, the message authentication code generating unit 33 generates the message authentication code 102 and the verification key using the key for generating the message authentication code 102 included in the order information, the ID code 100, the attribute information 101 generated in S1306, and the class information 103 or the version information 104 (S1309).

In the case where the order information fails to contain the key for generating the message authentication code 102, the random number acquired in S1308 is used as the key for generating the message authentication code 102.

Then, the extension ID code generating unit 32 generates the extension ID code 200 using the ID code 100 included in the order information, the attribute information 101 generated in S1306, the class information 103 or the version information 104 and the message authentication code 102 generated in S1309 (S1310).

In the case where the extension ID code 200 is required to be encrypted (YES in S1311), the extension ID code generating unit 32 encrypts the extension ID code 200 using the encryption key included in the order information (S1312), and attaches the encryption code 105 (S1313).

In the case where the encryption key is not included in the order information, on the other hand, the random number acquired in S1308 is used as an encryption key.

Then, the communication unit 34 generates the order receiving information including the order information received in S1301, the extension ID code 200 generated in S1310 or the encrypted extension ID code 200 generated in S1313 and the key obtained from the random number generated in S1308 (S1317).

After that, the communication unit 34 generates an order receiving ID code registration request including the order receiving information generated in S1317, and after encryption for communication, transmits it to the ID code management terminal 5 through the network 1 (S1314). Also, the communication unit 34 generates an identification tag production request including the order receiving information generated in S1317, and after encryption for communication, transmits it to the identification tag production factory terminal 4 through the network 1 (S1315).

Further, the communication unit 34 encrypts for communication the order receiving information generated in S1317, and transmits it to the customer terminal 8 through the network 7 (S1318).

The steps S1314, S1315 and S1218 may be replaced with each other in order.

The process of S1306 to S1310 may be executed immediately after S1301. In such a case, the ID code duplication check request generated in S1302 includes the extension ID code 200 generated in S1310.

Now, the operation of the identification tag production factory terminal 4 will be explained.

Figure 10:
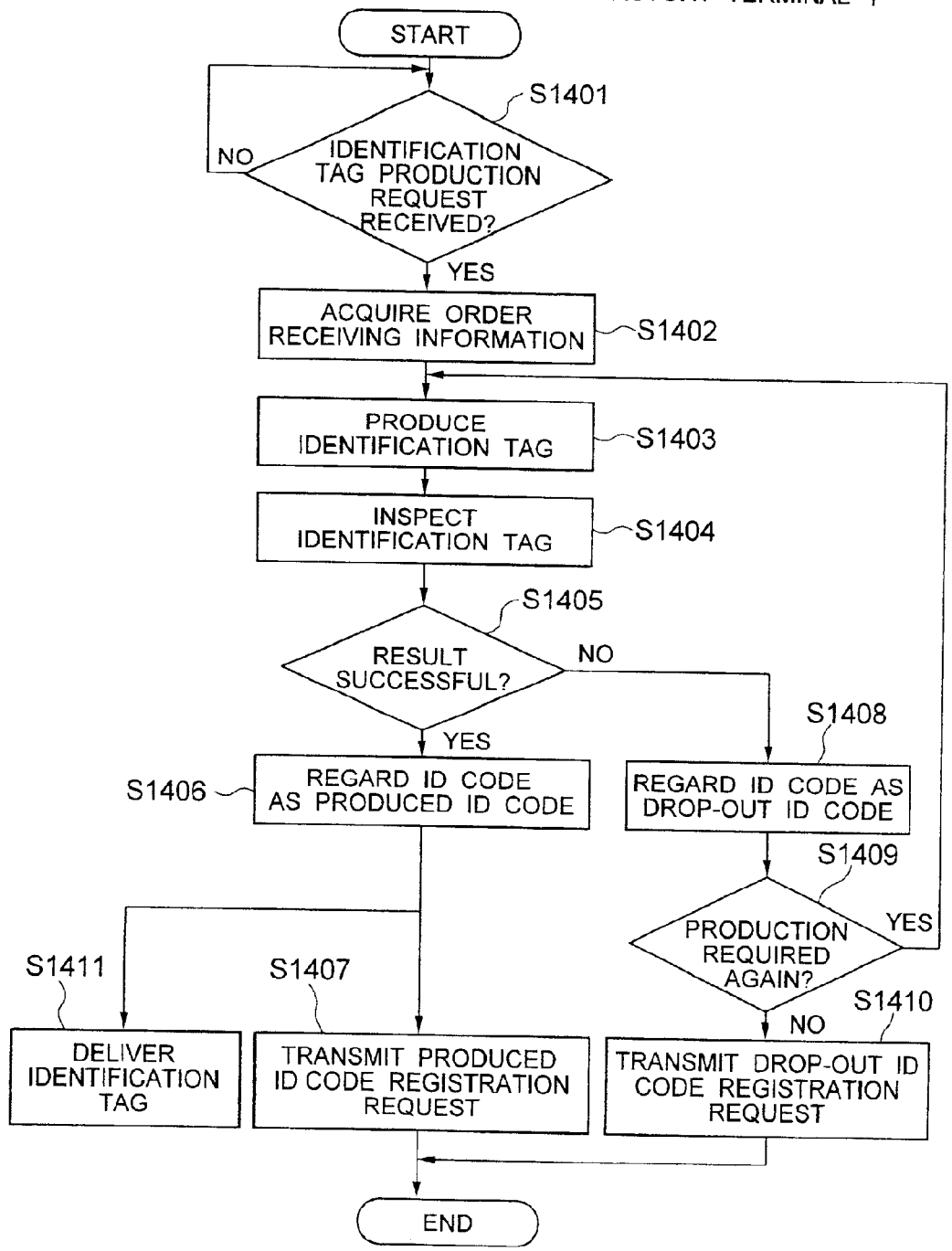
FIG. 10 is a flowchart for explaining the operation of the identification tag production factory terminal 4 shown in FIG. 5.

FIG. 10 is a flowchart for explaining the operation of the identification tag production factory terminal 4.

First, the communication unit 41 stands by until the identification tag production request is received from the ID code order receiving terminal 3 through the network 1 (S1401). Upon receipt of the identification tag production request (YES in S1401), the communication unit 41 decrypts the encrypted message received, and acquires the order receiving information (S1402).

Then, the control unit 44 instructs the production unit 42 to produce the identification tag 300 storing the extension ID code 200 included in the order receiving information acquired in S1402, and the production unit 42 produces the identification tag 300 in accordance with the order receiving information (S1403).

Then, the control unit 44 instructs the inspection unit 43 to check whether the function of the identification tag 300 produced in S1403 works normally or not, and the inspection unit 43 checks the identification tag 300 received from the production unit 42 thereby to determines that the extension ID code 200 received from the control unit 44 is rightly stored (S1404).

In the case where the inspection result received from the inspection unit 43 is normal (YES in S1405), the control unit 44 regards the extension ID code 200 attached to the identification tag 300 as a produced ID code (S1406).

The communication unit 41 generates a produced ID code registration request including the produced ID code obtained in S1406, and after encryption for communication, transmits it to the ID code management terminal 5 through the network 1 (S1407).

The delivery unit 45 receives the identification tag 300 indicating the successful inspection result of the inspection unit 43 and in accordance with the delivery method included in the order receiving information, ships and delivers the identification tag 300 to the customer (S1411).

In the case where the inspection result received from the inspection unit 43 is a failure (NO in S1405), on the other hand, the control unit 44 regards the extension ID code 200 attached to the identification tag 300 as a drop-out ID code (S1408).

In the case where the identification tag 300 for which the inspection result is a failure is required to be produced again (YES in S1409), the control unit 44 causes the production unit 42 to produce the identification tag 300 again and attaches the drop-out ID code obtained in S1408 (S1403).

In the case the identification tag 300 is not required to be produced again (NO in S1409), on the other hand, the communication unit 41 generates a drop-out ID code registration request including the drop-out ID, and after encryption for communication, transmits it to the ID code management terminal 5 through the network 1 (S1410).

Now, the operation of the ID code management terminal 5 will be explained.

Figure 11:
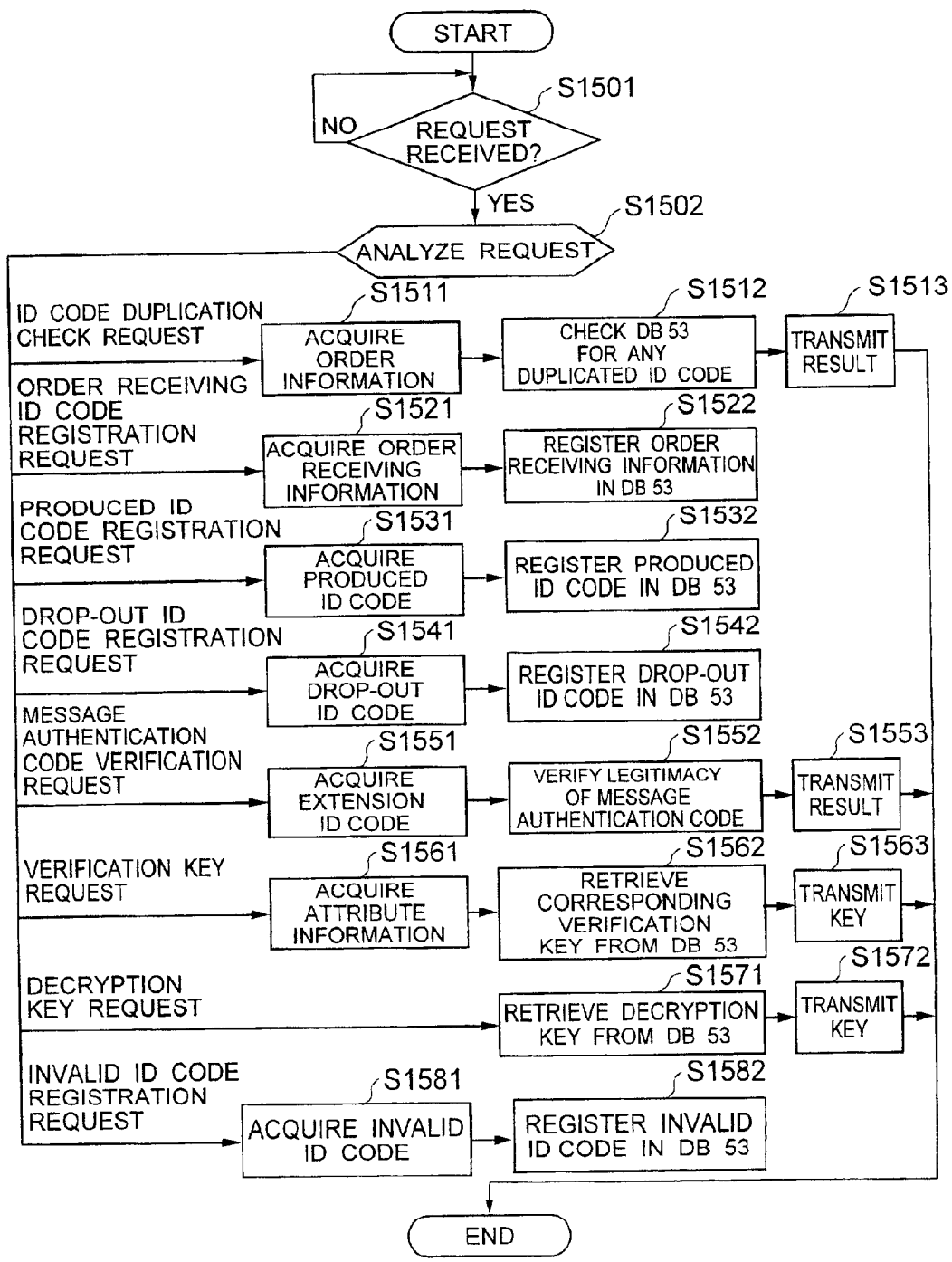
FIG. 11 is a flowchart for explaining the operation of the ID code management terminal 5 shown in FIG. 6.

FIG. 11 is a flowchart for explaining the operation of the ID code management terminal 5.

First, the communication unit 51 stands by until it receives a request through the network 1 from the ID code order receiving terminal 3 or the identification tag production factory terminal 4 or a request through the network 3 from the ID code utilization terminal 6 (S1501).

Upon receipt of the request (YES in S1501), the communication unit 51 decrypts the encrypted message received and obtains the request including various information described later (S1502).

Then, the ID code-related information management unit 52 analyzes the contents of the request acquired in S1502.

In the case where the acquired request is an ID code duplication check request from the ID code order receiving terminal 3, the ID code-related information management unit 52 acquires the order receiving information included in the ID code duplication check request (S1511). Then, the ID code-related information management unit 52 checks whether the ID code is duplicated or not using the extension ID code 200 included in the order receiving information acquired in S1511 and the extension ID code 200 stored in the ID code-related information management data base 53 (S1512).

Even in the case where the same extension ID code 200 is stored in the ID code-related information management data base 53, a duplication is not assumed as long as the particular extension ID code 200 is regarded as invalid. The result of check is encrypted by the communication unit 51 and transmitted to the ID code order receiving terminal 3 through the network 1 (S1513).

In the case where the acquired request is an order receiving ID code registration request from the ID code order receiving terminal 3, the ID code-related information management unit 52 acquires the order receiving information included in the particular order receiving registration request (S1521). Then, the order receiving information acquired in S1521 is stored in the ID code-related information management data base 53 (S1522).

In the case where the acquired request is a produced ID code registration request from the identification tag production factory terminal 4, the ID code-related information management unit 52 acquires the produced ID code included in the produced ID code registration request (S1531).

Then, the produced ID code acquired in S1531 is stored in the ID code-related information management data base 53 (S1532).

In the case where the acquired request is a drop-out ID code registration request from the identification tag production factory terminal 4, the ID code-related information management unit 52 acquires the drop-out ID code included in the particular drop-out ID code registration request (S1541). Then, the drop-out ID code acquired in S1541 is stored in the ID code-related information management data base 53 (S1542).

In the case where the acquired request is a verification request from the ID code utilization terminal 6, the ID code-related information management unit 52 acquires the extension ID code 200 included in the verification request (S1551).

Then, the extension ID code 200 acquired in S1551 is compared with the extension ID code 200 stored in the ID code-related information management unit data base 53 thereby to verify whether the message authentication code 102 is legitimate or not (S1552).

The result of verification is encrypted in the communication unit 51 and transmitted to the ID code utilization terminal 6 through the network 2 (S1553).

In the case where the acquired request is a verification key request from the ID code utilization terminal 6, the ID code-related information management unit 52 acquires the attribute information 101 included in the verification key request of the message authentication code 102 (S1561).

Then, the key for verification of the message authentication code 102 is retrieved which is stored in the ID code-related information management data base 53 as an item related to the attribute information 101 acquired in S1561 (S1562). The key for verification of the message authentication code 102 retrieved in S1562 is encrypted in the communication unit 51 and transmitted to the ID code utilization terminal 6 through the network 2 (S1563).

In the case where the acquired request is a decryption key request from the ID code utilization terminal 6, the ID code-related information management unit 52 retrieves the key for decryption of the encrypted extension ID code 200 stored in the ID code-related information management data base 53 (S1571).

Then, the key for decryption of the encrypted extension ID code 200 which has been retrieved in S1571 is encrypted in the communication unit 51 and transmitted to the ID code utilization terminal 6 through the network 2 (S1572).

In the case where the acquired request is an invalid registration request from the ID code utilization terminal 6, the ID code-related information management unit 52 acquires the invalid ID code and the digital signature included in the particular invalid ID code registration request (S1581).

Then, it is checked whether the invalid ID code registration request is a legitimate request by means of the digital signature acquired in S1581, and the invalid ID code acquired in S1581 is stored in the ID code-related information management data base 53 (S1582).

Now, the operation of the ID code utilization terminal 6 will be explained.

Figure 12:
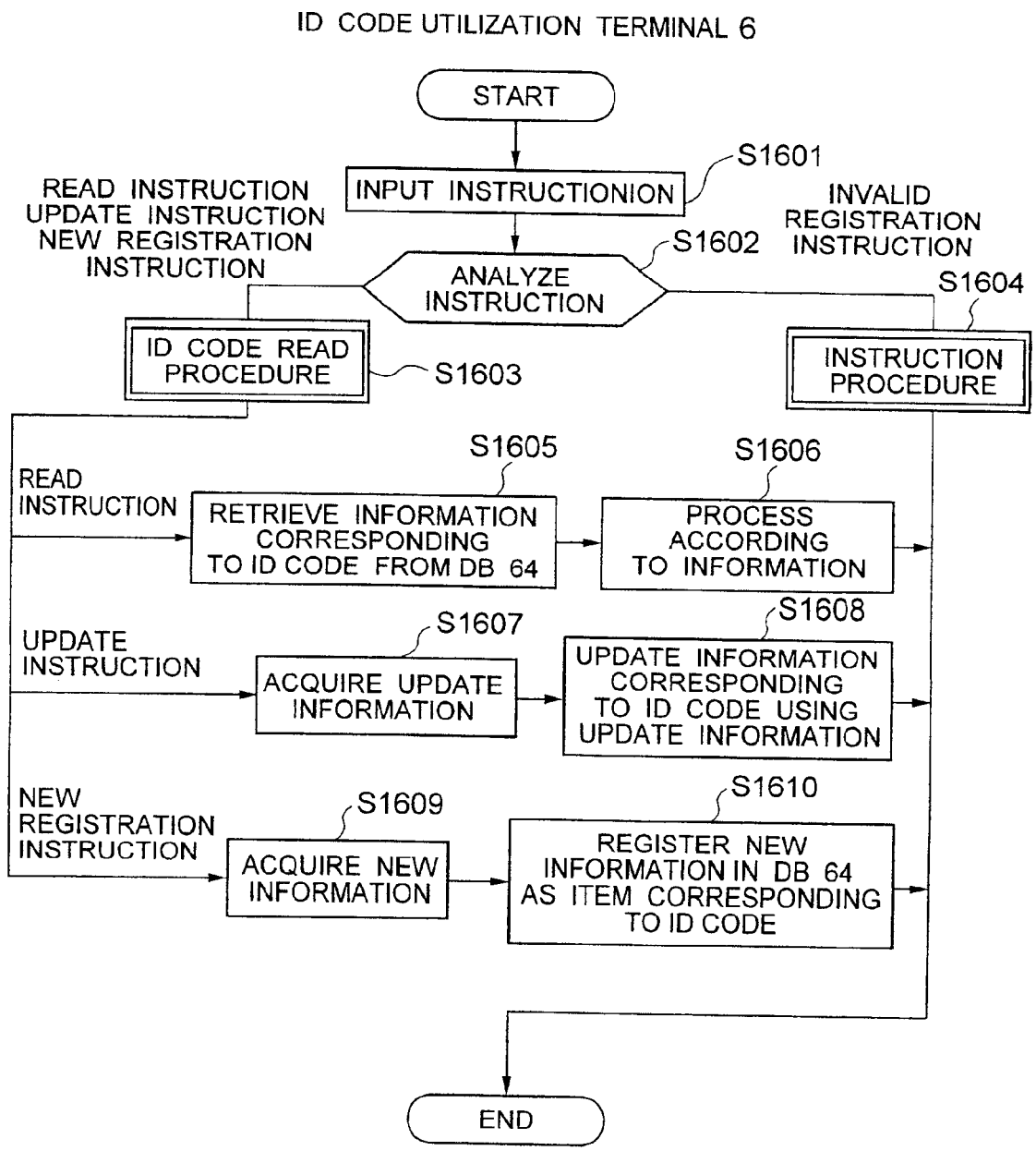
FIG. 12 is a flowchart for explaining the general operation the ID code utilization terminal 6 shown in FIG. 7.

FIG. 12 is a flowchart for explaining an outline of the operation of the ID code utilization terminal 6.

First, an instruction input is received by an input/output unit 62 (S1601). Then, a control unit 63 analyzes the instruction received in S1601 (S1602).

In the case where the instruction received in S1601 is an instruction to read information, an instruction to update information or an instruction to newly register information, then a reader 61, the control unit 63, a data base 64 and a communication unit 65 carry out the ID code read procedure (S1603).

The process in S1603 will be explained in detail later with reference to FIGS. 13 to 15.

In the case where the instruction received in S1601 is an invalid registration instruction, the control unit 63, the data base 64 and the communication unit 65 carries out the invalid procedure (S1604) for invalidating the extension ID code 200 attached to the identification tag 300 to be read.

The process in S1604 will be explained in detail later with reference to FIG. 19.

In the case where the instruction received in S1601 is an instruction to read information, S1603 is followed by S1605 in which the control unit 63 retrieves the information stored in the data base 64 as an item corresponding to the extension ID code 200 acquired in S1603 (S1605). The information retrieved in S1605 output from the input/output unit 62, the payment process is executed in compliance with the instruction included in the information thus retrieved. This information is transferred to the terminal indicated by the particular information, or otherwise the information is processed as required (S1606).

In the case where the instruction received in S1601 is an update instruction including update information, the control unit 63 acquires the update information after S1603 (S1607). The information stored in the data base 64 as an item corresponding to the extension ID code 200 acquired in S1603 is updated by the update information acquired in S1607 (S1608).

In the case where the instruction received in S1601 is an instruction to newly register the information including the corresponding information, the control unit 63 acquires the corresponding information following S1608 (S1609). The corresponding information acquired in S1609 is matched with the extension ID code 200 acquired in S1603 and stored in the data base 64 (S1610).

Figure 13:
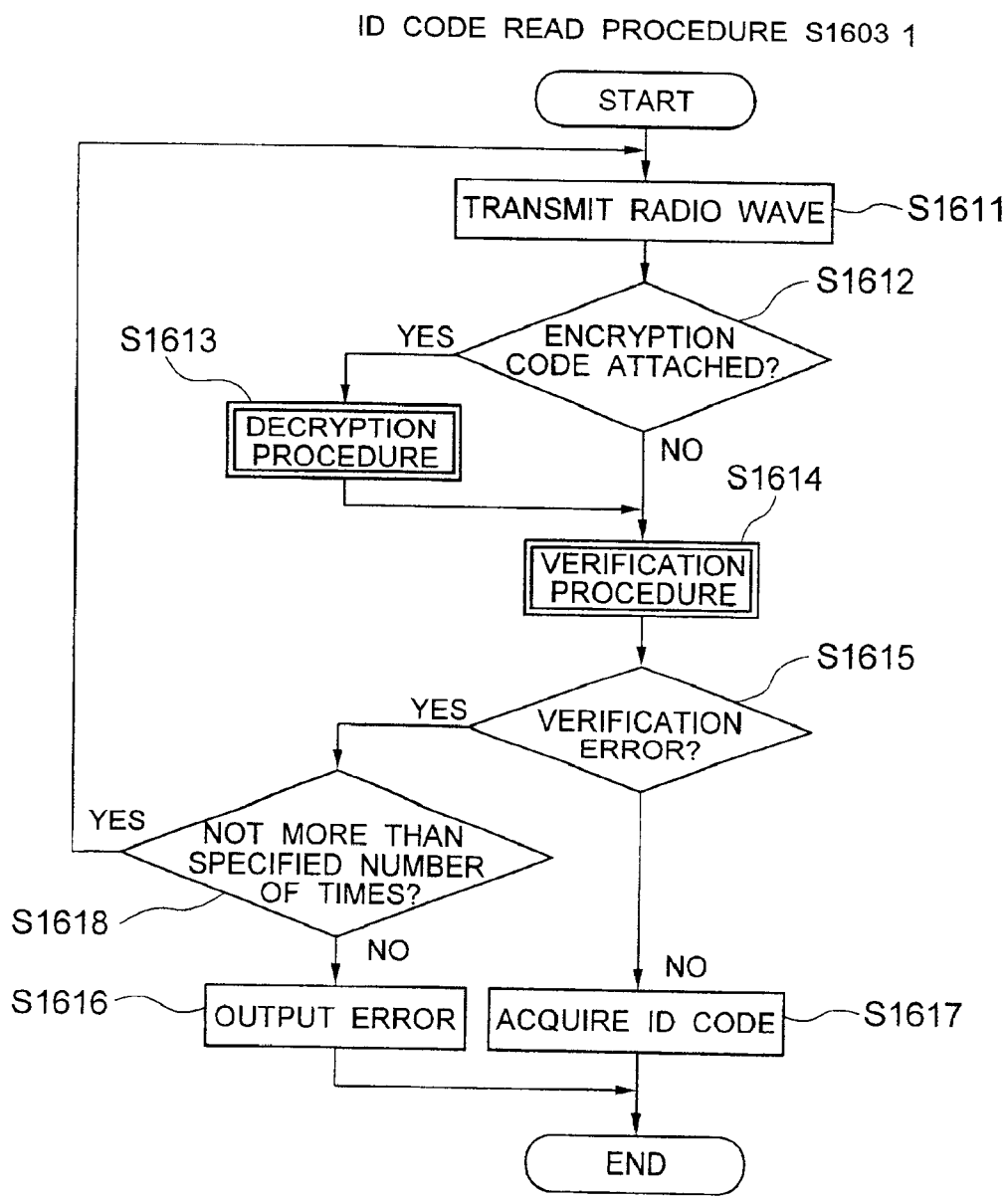
FIG. 13 is a flowchart for explaining an outline of the process of S1602 (ID code read procedure) shown in FIG. 12.

FIG. 13 is a flowchart for explaining an outline of the process in S1603 (ID code read procedure) shown in FIG. 12.

First, the ID code reader 61 drives an electronic circuit chip 301 mounted on the identification tag 300 by transmitting a radio wave, and reads the data transmitted from the electronic circuit chip 301 (S1611).

In the case where the data read in S1611 includes the encryption code 105 (YES in S1612), the control unit 63 carries out the decryption procedure (S1613). The process of S1613 will be described in detail later with reference to FIG. 14.

The control unit 63 carries out the procedure for verification of the data read in S1611 or the data acquired by decryption in S1613 (S1614). The process of S1614 will be described in detail later with reference to FIG. 13.

In the case where the result of the process in S1614 is an error (YES in S1615), the control unit 63 determines whether the data is read the number of times not more than a specified number (S1618).

In the case where the number of times the data is read is not more than the specified number (YES in S1618), the ID code is read again (S1611). In the case where the number of times the data is read has reached the specified number (NO in S1618), on the other hand, an error is output to the input/output unit 62 (S1616).

In the case where the result of S1614 is not an error (NO in S1615), in contrast, the control unit 63 acquires the extension ID code 200 legitimately verified (S1617).

Figure 14:
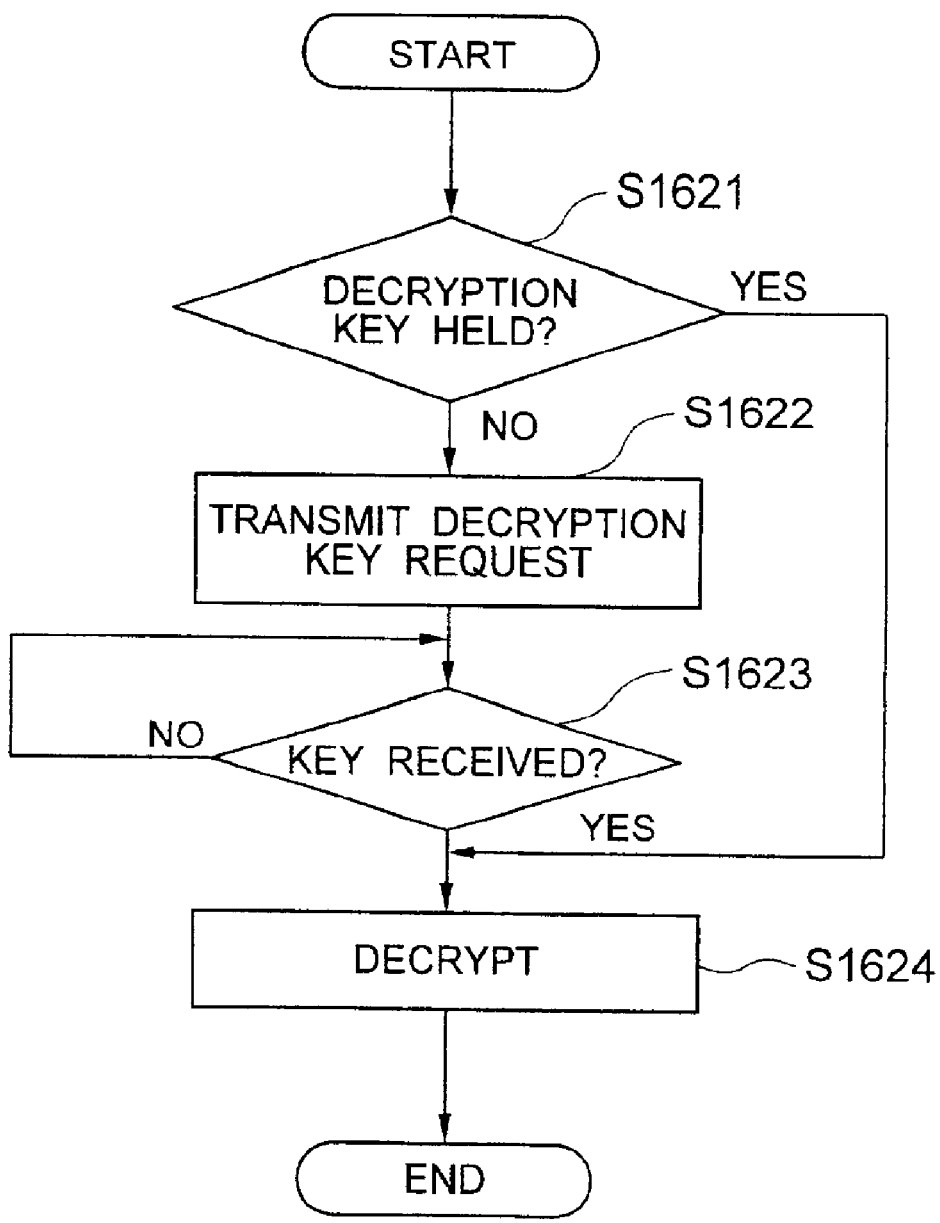
FIG. 14 is a flowchart for explaining the process of S1613 (decryption procedure) shown in FIG. 13.
Figure 15:
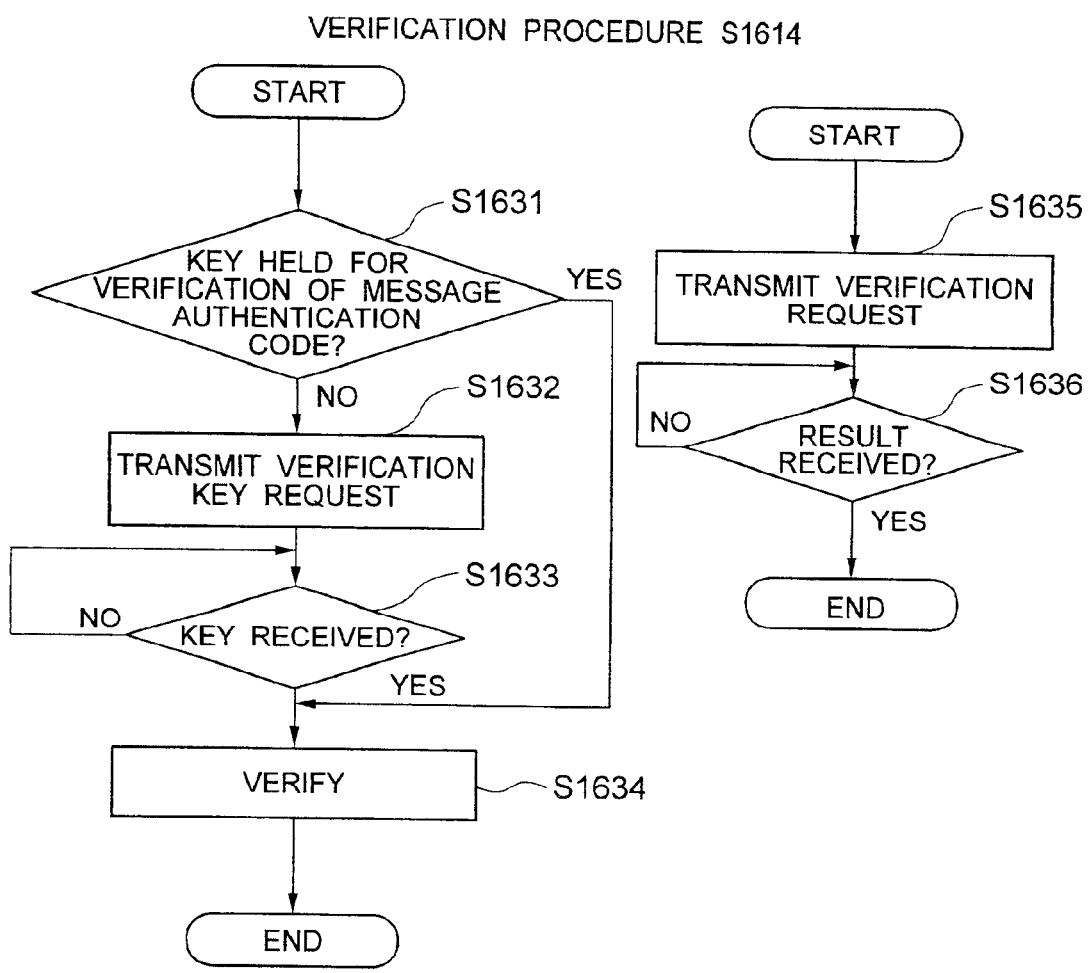
FIGS. 15A and 15B are flowcharts for explaining the process of S1614 (verification procedure) shown in FIG. 13.

FIG. 14 is a flowchart for explaining the process of S1613 (decryption procedure) shown in FIG. 13.

First, the control unit 63 checks whether the decryption key is stored in the data base 64 or not (S1612). In the case where the decryption key is not stored in the data base 64 (NO in S1621), the communication unit 65 generates a decryption key request, and after encryption for communication, transmits it to the ID code management terminal 5 through the network 2 (S1622). Then, the control unit 63 stands by until it receives the decryption key from the ID code management terminal 5 (S1623).

Then, the control unit 63 decrypts the encrypted extension ID code 200 using the decryption key stored in the data base 64 or the decryption key acquired in S1623 (S1624).

FIGS. 15A and 15B are flowcharts for explaining the process of S1614 (verification procedure) shown in FIG. 13. FIG. 15A will be explained first as an example of the process of S1614 (verification procedure) shown in FIG. 13.

First, the control unit 63 checks whether the verification key is stored in the data base 64 or not (S1631). In the case where the verification key is not stored in the data base 64 (NO in S1631), the communication unit 65 generates a verification key request including the attribute information 101, and after encryption for communication, transmits it to the ID code management terminal 5 through the network 2 (S1632). Then, the control unit 63 stands by until it receives the verification key from the ID code management terminal 5 (S1633).

Then, the control unit 63 verifies the message authentication code 102 using the verification key stored in the data base 64 or the verification key acquired in S1633 (S1634).

Reference is had to FIG. 15B for explaining another example of the process of S1614 (verification procedure) shown in FIG. 13.

The communication unit 65 generates a verification request including the extension ID code 200 and after encryption for communication, transmits it to the ID code management terminal 5 through the network 2 (S1635), and then stands by until the verification result is received from the ID code management terminal 5 (S1636).

Figure 19:
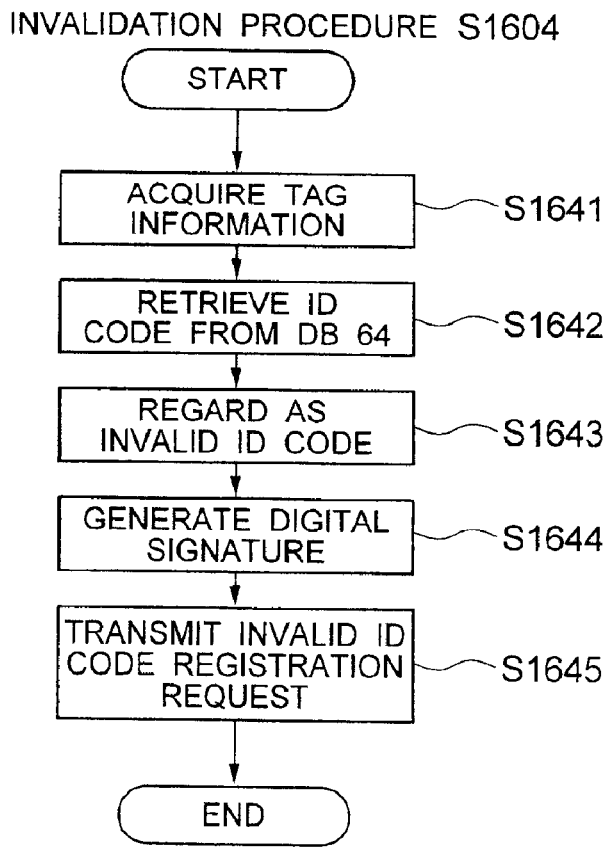
FIG. 19 is a flowchart for explaining an outline of the process of S1604 (invalidation procedure) shown in FIG. 12.

FIG. 19 is a flowchart for explaining the process of S1604 (invalidation procedure) shown in FIG. 12.

First, the input/output unit 62 acquires the input of the tag information on the identification tag 300 which has failed to be read, including the symbol printed on the surface of the identification tag 300 and the information on the material object to which the particular identification tag 300 is attached, in order to estimate the extension ID code 200 attached to the identification tag 300 (S1641).

Then, the control unit 63 searches the data base 64 for the tag information received in S1641 and retrieves the corresponding extension ID code 200 (S1642). The extension ID code 200 thus retrieved is regarded as an invalid ID code (S1643).

Then, the communication unit 65 generates a digital signature (S1644), generates an invalid ID code registration request including the particular digital signature and the invalid ID code and after encryption for communication, transmits it to the ID code management terminal 5 through the network 2 (S1645).

According to this embodiment, the cipher communication is established between the ID code production factory terminal 4 and the ID code management terminal 5 through the network 1. Also, the information including the order receiving information, the issued ID code and the drop-out ID code are collectively managed by the ID code management terminal 5.

In view of the fact that the electronic circuit chip 301 with the extension ID code 200 stored in a read-only area thereof is used as the identification tag 300, a third party cannot illegally tamper the extension ID code 200 attached to the identification tag 300.

Also, the production of the electronic circuit chip 301 requires sufficient equipment. The smaller and thinner the electronic circuit chip 301, the more limited the persons who can produce the electronic circuit chip 301, thereby reducing the chance of a third party illegally producing a copy of the identification tag. Also, the ID code is regarded as invalid only in the case where the legitimacy is substantiated by checking the digital signature of the ID code utilization terminal 6 who has given an invalidation request.

These facts makes it possible for the ID code management terminal 5 to manage the number of the identification tags 300 available on the market. Also, highly sensitive information can be managed confidentially.

Further, according to this embodiment, even in the case where the ID code utilization terminal 6 fails to hold a key or device for verification, the verification result can be obtained by transmitting a verification request including the ID code 100, the ID code attribute information 101 and the message authentication code 102 to the ID code management terminal 5 through the network 2.

Also, according to this embodiment, even in the case where the ID code utilization terminal 6 fails to hold the verification key, the verification key can be obtained by transmitting a verification key request including the ID code attribute information 101 to the ID code management terminal 5 through the network 2.

This invention is not limited to the above-mentioned embodiments but modifiable variously within the scope and spirit of the invention.

In the embodiments described above, for example, the ID code utilization terminal 6 is necessarily constructed on a single device. Instead, the portion for reading the extension ID code 200 or the portion for input/output of information and instructions can be constructed on a device different from the portion related to the data base 64, and these devices are connected through a network.

Conversely, the ID code management terminal 5 may have also the function of the portion related to the data base 64 of the ID code utilization terminal 6.

Also, unlike in the aforementioned embodiments wherein a random number is generated by the ID code order receiving terminal 3 and handled as a key in the case where the order information included in the order receiving information request sent from the customer terminal 8 to the ID code order receiving terminal 3 fails to include the verification key or the encryption key, the customer terminal 8 may have the function of generating a random number.

In such a case, the random number generated in the customer terminal 8 is included in the order information as a verification key or an encryption key, as the case may be, and transmitted to the ID code order receiving terminal 3.

It will thus be understood from the foregoing description that according to this invention, there is provided a system for managing the issue and distribution of the ID code having a message authentication code and capable of efficiently and reliably managing the material object using the ID code.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. An ID code management method for managing an ID code using an ID code management system including an ID code order receiving terminal for receiving an order for issue of an ID code, a production factory terminal for producing an identification tag storing said ID code, and an ID code management terminal connected to said ID code order receiving terminal and said production factory terminal through a network, said identification tag having mounted thereon an electronic circuit chip with data capable of being read from an external source, said electronic circuit chip having a read-only storage area for storing externally readable data constituting an extension ID code including an ordered ID code, attribute information and a message authentication code of the ID code, said method comprising the steps of:

an order receiving ID code registration step in which in the case where an order receiving ID code registration request including said extension ID code is sent to said ID code management terminal from said ID code order receiving terminal, said extension ID code is registered in a data base of said ID code management terminal as already registered; and a produced ID code registration step in which in the case where a produced ID code registration request including said extension ID code stored in said produced identification tag is sent from said production factory terminal to said ID code management terminal, said identification tag storing said extension ID code is registered in said data base of said ID code management terminal as already produced.

2. An ID code management method according to claim 1, further comprising an ID code duplication check step in which in the case where an ID code duplication check request including said extension ID code is sent to said ID code management terminal from said ID code order receiving terminal, said ID code management terminal checks whether said extension ID code is registered or not in said data base as already ordered and the result of the check is notified to said ID code order receiving terminal.

3. An ID code management method according to claim 1, further comprising a drop-out ID code registration step in which in the case where a drop-out ID code registration request including said extension ID code stored in said identification tag is sent to said ID code management terminal from said identification tag production factory terminal, the extension ID code included in said request is registered in said data base of said ID code management terminal as a drop-out ID code.

4. An ID code management method according to claim 1, wherein said ID code management system includes an ID code utilization terminal connected to said ID code management terminal through a network, said method further comprising a verification step in which in the case where a verification request including said extension ID code is sent to said ID code management terminal from said ID code utilization terminal, said extension ID code is compared with the extension ID code stored in the data base of said ID code management terminal and it is verified in said ID code management terminal whether said message authentication code included in said extension ID code sent to said ID code management terminal is legitimate or not.

5. An ID code management method according to claim 1, wherein said ID code management system includes an ID code utilization terminal connected to said ID code management terminal through a network, said method further comprising a step in which in the case where a verification key request including the attribute information of said ID code is sent from said ID code utilization terminal to said ID code management terminal, a key for verification of said message authentication code stored in the data base of said ID code management terminal as an item corresponding to attribute information is transmitted to said ID code utilization terminal.

6. An ID code management method according to claim 1, wherein said ID code management system comprises an ID code utilization terminal connected to said ID code management terminal through a network, said method further comprising a step in which in the case where a decryption key request is sent from said ID code utilization terminal to said ID code management terminal, the key for decryption of an encrypted extension ID code stored in the data base of said ID code management terminal is transmitted to said ID code utilization terminal.

7. An ID code management method according to claim 1, wherein said ID code management system comprises an ID code utilization terminal connected to said ID code management terminal through a network, said method further comprising an invalid ID code registration step in which in the case where an invalid ID code registration request including said extension ID code is sent from said ID code utilization terminal to said ID code management terminal, the extension ID code included in said request is registered in said data base of said ID code management terminal as an invalid ID code.

8. An ID code management method according to claim 1, wherein said ID code management system comprises a customer terminal connected to said ID code order receiving terminal through a network, said method further comprising:

an extension ID code generating step in which in the case where the order information including the information on the customer ordering said identification tag, an ID code desirably stored in said identification tag and a key for generating a message authentication code of said ID code is sent to said ID code order receiving terminal from said customer terminal, the attribute information and said message authentication code of said ID code are generated in said ID code order receiving terminal using said order information thereby to generate said extension ID code;

a step in which the order receiving information including said order information and said extension ID code is transmitted by said ID code order receiving terminal in response to a request from said customer terminal;

an order receiving ID code registration request step in which an order receiving ID code registration request including said order receiving information is transmitted by said ID code order receiving terminal to said ID code management terminal; and an identification tag production request step in which an identification tag production request including said extension ID code is transmitted by said ID code order receiving terminal to said identification tag production factory terminal.

9. An ID code management method according to claim 1, further comprising:

a step in which said identification tag production factory terminal causes said identification tag to be produced in the case where an identification tag production request including said extension ID code is sent to said identification tag production factory terminal from said ID code order receiving terminal;

a step in which said identification tag production factory terminal causes said produced identification tag to be inspected; and a produced ID code registration request step in which a produced ID code registration request including said extension ID code stored in said identification tag is transmitted by said identification tag production factory terminal to said ID code management terminal in the case where the result of the inspection in said inspection step is successful.

10. An ID code management method according to claim 1, further comprising:

an inspection input step in which said ID code utilization terminal receives an instruction for a processing operation;

an ID code read step in which said ID code utilization terminal acquires said extension ID code from said electronic circuit chip mounted on said identification tag;

a verification step in which said ID code utilization terminal verifies the legitimacy of said extension ID code acquired in said read step, using said message authentication code included in said extension ID code;

a step in which the information corresponding to said extension ID code acquired in said ID code read step is retrieved from the data base of said ID code utilization terminal and a process determined in accordance with said information is performed in said ID code utilization terminal in the case where the instruction received in said instruction input step is an instruction to read information;

a step in which said ID code utilization terminal acquires update information and updates the information corresponding to said extension ID code acquired in said ID code read step using said update information in the case where the instruction received in said instruction input step is an update instruction;

a step in which said ID code utilization terminal acquires new information and stores said new information in the data base of said ID code utilization terminal as an item corresponding to said extension ID code acquired in said ID code read step in the case where the instruction received in said instruction input step is an instruction for new registration; and an invalid registration request step in which said ID code utilization terminal retrieves said extension ID code corresponding to the information of said identification tag from the data base of said ID code utilization terminal and transmits an invalid ID code registration request including said extension ID code to the ID code management terminal in the case where the instruction received in said instruction input step is an instruction to register an invalid ID code.

11. An ID code management system comprising an ID code order receiving terminal for receiving an order for issue of an ID code, a production factory terminal for producing an identification tag storing said ID code, and an ID code management terminal connected to said ID code order receiving terminal and said production factory terminal through a network;

wherein said identification tag includes an electronic circuit chip capable of which data can be read from an external source;

wherein said electronic circuit chip has a read-only storage area for storing an extension ID code including an ordered ID code, ID code attribute information and an ID code message authentication code constituting externally readable data;

wherein said ID code order receiving terminal includes an order receiving ID code registration request processing unit for sending to said ID code management terminal an order receiving ID code registration request including the order receiving information generated from the order information received at the time of receiving an order;

wherein said ID code management terminal includes an order receiving ID code registration processing unit for registering said extension ID code as registered in a data base in the case where said order receiving ID code registration request is sent to said ID code management terminal;

wherein said production factory terminal includes a produced ID code registration request processing unit for causing a produced ID code registration request including said extension ID code stored in said produced identification tag to be sent to said ID code management terminal; and wherein said ID code management terminal includes a produced ID code registration processing unit for registering said identification tag storing said extension ID code as produced in said data base in the case where said produced ID code registration request is sent to said ID code management terminal.

12. An ID code management system according to claim 11, in which said ID code management terminal further includes:

an ID code duplication check processing unit for checking whether said extension ID code is registered in said data base as ordered and notifying the result of check to said ID code order receiving terminal in the case where an ID code duplication check request including said extension ID code is sent to said ID code management terminal from said ID code order receiving terminal.

13. An ID code management system according to claim 11, in which said ID code management terminal further includes:

a drop-out ID code registration processing unit in which in the case where a drop-out ID code registration request including said extension ID code stored in said identification tag is sent to said ID code management terminal from said identification tag production factory terminal, the extension ID code included in said drop-out ID code registration request is registered as a drop-out ID code in said data base.

14. An ID code management system according to claim 11, comprising an ID code utilization terminal connected to said ID code management terminal through a network;
wherein said ID code management terminal further includes a verification processing unit for verifying whether the message authentication code included in the extension ID code included in a verification request which may be sent from said ID code utilization terminal to said ID code management terminal is legitimate by comparing said extension ID code included in said verification request with the extension ID code stored in a data base.

15. An ID code management system according to claim 11 comprising an ID code utilization terminal connected to said ID code management terminal through a network;
wherein said ID code management terminal further includes a processing unit in which in the case where a verification key request including the attribute information of said ID code is sent from said ID code utilization terminal to said ID code management terminal, a key for verification of said message authentication code stored in a data base as an item corresponding to the attribute information of said ID code is transmitted to said ID code utilization terminal.

16. An ID code management system according to claim 11, comprising an ID code utilization terminal connected to said ID code management terminal through a network;
wherein said ID code management terminal further includes a processing unit for transmitting to said ID code utilization terminal a key for decrypting the encrypted extension ID code stored in a data base in the case where a decryption key request is sent from said ID code utilization terminal to said ID code management terminal.

17. An ID code management system according to claim 11, comprising an ID code utilization terminal connected to said ID code management terminal through a network;
wherein said ID code management terminal further includes an invalid ID code registration processing unit for registering in said data base said extension ID code included in an invalid registration request as an invalid ID code in the case where said invalid ID code registration request is sent from said ID code utilization terminal to said ID code management terminal through a network.

18. An ID code management system according to claim 11, comprising a customer terminal connected to said ID code order receiving terminal through a network:
wherein said ID code order receiving terminal includes;
an extension ID code generation processing unit for generating said extension ID code by generating the attribute information and said message authentication code of said ID code using the order information which may be sent from said customer terminal to said ID code order receiving terminal and includes the information on the customer ordering said identification tag, an ID code desirably stored in said identification tag and a key for generating said message authentication code of said ID code;
an order receiving information transmission processing unit for transmitting the order receiving information including said order information and said extension ID code in response to a request from said customer terminal;
an order receiving ID code registration request processing unit for transmitting the order receiving registration request including said order receiving information to said ID code management terminal; and
an identification tag production request processing unit for transmitting an identification tag production request including said extension ID code to said identification tag production factory terminal.

19. An ID code management system according to claim 11, wherein said identification tag production factory terminal includes:
a control unit for instructing said identification tag to be produced and said produced identification tag to be inspected in the case where an identification tag production request including said extension ID code is sent from said ID code order receiving terminal to said identification tag production factory terminal; and
a produced ID code registration request processing unit for transmitting a produced ID code registration request including said extension ID code stored in said identification tag to said ID code management terminal in the case where the result of inspection in said inspection processing unit is successful.

20. An ID code management system according to claim 11, wherein said ID code utilization terminal includes:
an instruction input processing unit for receiving an instruction for a processing operation;
an ID code read processing unit for acquiring said extension ID code from said electronic circuit chip mounted on said identification tag;
a verification processing unit for verifying the legitimacy of said extension ID code acquired in said read processing unit, using said message authentication code included in said extension ID code;
a processing unit for retrieving from a data base the information corresponding to said extension ID code acquired in said ID code read processing unit and performing a process determined in accordance with said information in the case where the instruction received in said instruction input processing unit is an information read instruction;
a processing unit for acquiring update information and updating the information corresponding to said extension ID code acquired in said ID code read processing unit, using said update information, in the case where the instruction received in said instruction input processing unit is an update instruction;
a processing unit for acquiring new information and storing said new information in a data base as an item corresponding to said extension ID code acquired in said ID code read processing unit in the case where the instruction received in said instruction input processing unit is an instruction for new registration; and
a processing unit for retrieving said extension ID code corresponding to the information of said identification tag from a data base and transmitting an invalid ID code registration request including said extension ID code to the ID code management terminal in the case where the instruction received in said instruction input step is an instruction for invalid ID code registration.

21. An ID code management terminal connected to networks and used for management of the extension ID code stored in an identification tag, wherein said tag includes a read-only storage area from which data can be read by an external source, and said area has stored therein an extension ID code including an ordered ID code, the attribute information and a message authentication code of said ID code, said ID code management terminal comprising:
  storage means for storing a data base for registering said extension ID code and the information related to said extension ID code;
  communication means for establishing communication with other terminals connected to said networks;
  order receiving ID code registration means for registering said extension ID code as registered in the case where an order receiving registration request including the order receiving information generated from the order information received at the time of ordering is sent from any of said other terminals to said ID code management terminal through said communication means; and
  produced ID code registration means for registering said identification tag storing said extension ID code as produced in said data base in the case where a produced ID code registration request including said extension ID code stored in said produced identification tag is sent from any of said other terminals to said ID code management terminal through said communication means.

22. An ID code management terminal according to claim 21, further comprising ID code duplication check means in which in the case where an ID code duplication check request including said extension ID code is sent from any of said other terminals through said communication means, it is checked whether said extension ID code is registered in said data base as ordered, said communication means transmitting the result of check in said ID code duplication check means to said other terminal.

23. An ID code management terminal according to claim 21, further comprising drop-out ID code registration means, in which in the case where a drop out ID code registration request including said extension ID code stored in said identification tag is sent to the ID code management terminal from any of said other terminals through said communication means, said extension ID code is registered in said data base as a drop-out ID code.

24. An ID code management terminal according to claim 21, further comprising verification means, in which in the case where a verification request including said extension ID code is sent from any of said other terminals to the ID code management terminal through said communication means, said extension ID code is compared with the extension ID code stored in a data base, and verifying whether said message authentication code included in said extension ID code is legitimate or not, said communication means transmitting the result of verification in said verification means to said other terminal.

25. An ID code management terminal according to claim 21, further comprising verification key acquisition means, in which in the case where a verification key request including the attribute information of said ID code is sent from any of said other terminals to the ID code management terminal through said communication means, the key for verification of said message authentication code stored in a data base as an item corresponding to said ID code attribute information is acquired, said communication means transmitting the key for verification of said message authentication code to said other terminal.

26. An ID code management terminal according to claim 21, further comprising decryption key acquisition means, in which in the case where a decryption key request is sent from any of said other terminals to the ID code management terminal through said communication means, a key for decryption of the encrypted extension ID code stored in a data base is acquired, said communication means transmitting the key for decrypting said encrypted extension ID code to said other terminal.

27. An ID code management terminal according to claim 21, further comprising invalid ID code registration means, in which in the case where an invalid registration request including said extension ID code is sent from any of said other terminals to the ID code management terminal through said communication means, the extension ID code included in said invalid ID code registration is registered in said data base as an invalid ID code.

28. An ID code order receiving terminal connected to networks for receiving an order for issue of an ID code stored in an identification tag, said identification tag having a read-only storage area from which data can be read by external means, said storage area having stored therein an extension ID code including an ID code ordered, the attribute information and a message authentication code of said ID code, said ID code order receiving terminal comprising:
  communication means for establishing communication with other terminals connected to said networks;
  an extension ID code generating unit in which in the case where the order information including information on the customer ordering said identification tag, an ID code desirably stored in said identification tag and a key for generating a message authentication code of said ID code is sent from any of said other terminals to said order receiving terminal, said extension ID code is generated by generating the attribute information and said message authentication code of said ID code using said order information;
  order receiving ID code registration request means for transmitting through said communication means to said ID code management terminal an order receiving registration request including the order receiving information generated from said order information; and
  identification tag production request means for transmitting an identification tag production request including said extension ID code to said identification tag production factory terminal through said communication means.

29. An ID code order receiving terminal according to claim 28, further comprising ID code duplication check request processing unit for transmitting an ID code duplication check request including said extension ID code to any of said other terminals through said communication means and thereby causing to check whether said extension ID code is duplicated with the extension ID code registered in said ID code management terminal.

30. An ID code order receiving terminal according to claim 28, further comprising means for generating a random number and using said random number as a key for generating said message authentication code.

31. An ID code order receiving terminal according to claim 28, further comprising means for encrypting said extension ID code and attaching an encryption code indicating that said extension ID code is encrypted.

32. An identification tag production factory terminal connected to a network and used in an identification tag production factory for producing an identification tag, said identification tag having a read-only storage area from which data can be read by external means, said storage area having stored therein an extension ID code including an ordered ID code, the attribute information and a message authentication code of an ID code, said identification tag production factory terminal comprising:

communication means for establishing communication with other terminals connected to said network;

control means in which in the case where an identification tag production request including said extension ID code is sent from any of said other terminals to said identification tag production factory terminal through said communication means, said identification tag is caused to be produced in accordance with said production request and said produced identification tag is caused to be inspected; and produced ID code registration request means, in which in the case where the result of said inspection is successful, a produced ID code registration request including said extension ID code stored in said identification tag is caused to be transmitted to said other terminal through said communication means and said other terminal is caused to register said identification tag including said extension ID code as produced.

33. An identification tag production factory terminal according to claim 32, further comprising drop-out ID code registration request means, in which in the case where the result of said inspection is a failure and said identification tag is not required to be produced again, a drop-out ID code registration request including said extension ID code stored in said identification tag is caused to be transmitted to any of said other terminals through said communication means and said other terminal is caused to register said extension ID code as a drop-out ID code.

34. An ID code utilization terminal connected to a network and used for utilization of an identification tag, said identification tag having a read-only storage area from which data can be read by external means, said storage area having stored therein an extension ID code including an ordered ID code, the attribute information and a message authentication code of the ID code, said ID code utilization terminal comprising:

storage means for storing a data base for registering said extension ID code, the information related to said extension ID code and the information corresponding to said identification tag storing said extension ID code;

communication means for establishing communication with other terminals connected to said network;

instruction input means for receiving an instruction for performing a processing operation;

ID code read means for acquiring said extension ID code from said electronic circuit chip mounted on said identification tag;

verification means for verifying the legitimacy of said extension ID code acquired in said ID code read means, using said message authentication code included in said extension ID code;

means for retrieving from a data base the information corresponding to said extension ID code acquired in said ID code read means and performing a process determined in accordance with said information, in the case where the instruction received in said instruction input means is an information read instruction;

means for acquiring update information and updating the information corresponding to said extension ID code acquired in said ID code read means, using said update information, in the case where the instruction received in said instruction input means is an update instruction;

means for acquiring new information and storing said new information in said data base as an item corresponding to said extension ID code acquired in said ID code read means, in the case where the instruction received in said instruction input means is an instruction for new registration; and means for retrieving said extension ID code corresponding to the information of said identification tag from said data base and transmitting an invalid ID code registration request including said extension ID code to the ID code management terminal, in the case where the instruction received in said instruction input means is an instruction for registering an invalid ID code.

35. An ID code utilization terminal according to claim 34, further comprising means for decrypting said extension ID code acquired in said ID code read means using the decryption key stored in said storage means in the case where said extension ID code is encrypted.

36. An ID code utilization terminal according to claim 34, further comprising means for transmitting a decryption key request to any of said other terminals and causing said other terminal to transmit said decryption key through said communication means, in the case where the extension ID code acquired in said ID code read means is encrypted and said storage means has no encryption key.

37. An ID code utilization terminal according to claim 34, further comprising means for transmitting a verification key request including said extension ID code acquired in said ID code read means to any of said other terminals and causing said other terminal to transmit said verification key through said communication means, in the case where said ID code utilization terminal has no key for verification of said message authentication code included in said extension ID code acquired in said ID code read means.

38. An ID code utilization terminal according to claim 34, further comprising verification request means for transmitting a verification request including said extension ID code acquired in said ID code read means to any of said other terminals through said communication means and causing said other terminal to verify the legitimacy of said extension ID code, said verification means using the result of said verification request sent from said other terminal as the result of inspection.

39. A program product for realizing an ID code management system including an ID code order receiving terminal for receiving an order for issue of an ID code, an identification tag production factory terminal for producing an identification tag storing said ID code, and an ID code management terminal, using a plurality of computers connectable to a network, said program product comprising:

a medium capable of being read by said computers;

a module for realizing an order receiving ID code registration request processing unit for causing said computer constituting said ID code order receiving terminal to send to said ID code management terminal an order receiving registration request including the order receiving information generated from the order information received at the time of receiving an order;

a module for realizing an order receiving ID code registration processing unit for causing said computer constituting said ID code management terminal to register said extension ID code as registered in a data base in the case where said order receiving ID code registration request is sent to said computer;

a module for realizing a produced ID code registration request processing unit for causing said computer constituting said identification tag production factory terminal to send to said ID code management terminal a produced ID code registration request including said extension ID code stored in said produced identification tag; and a module for realizing a produced ID code registration processing unit for causing said computer constituting said ID code management terminal to register in said data base said identification tag storing said extension ID code as produced in the case where said produced ID code registration request is sent to said computer.

40. A material object having an identification tag for managing the distribution, wherein said identification tag stores an extension ID code including the ID code of said material object, the attribute information and the message authentication code for said material object, wherein the legitimacy of said extension ID code can be checked by use of a data base storing said ID code, said attribute information, said message authentication code and a key for verifying said message authentication code by relating said ID code, said attribute information, said message authentication code and said key to each other, and wherein said extension ID code further includes version information indicating the number of digits of said extension ID code, the number of digits of said message authentication code and a method of calculation, and wherein said message authentication code is used also for tampering of said version information.

41. A material object having an identification tag according to claim 40, wherein said extension ID code further includes class information for controlling the assignment of said ID code and said attribute information.

* * * * *